United States Patent
Arai

(10) Patent No.: US 8,428,761 B2
(45) Date of Patent: Apr. 23, 2013

(54) PRODUCTION SYSTEM AND PRODUCTION METHOD

(75) Inventor: Yasuyuki Arai, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 456 days.

(21) Appl. No.: 11/386,757

(22) Filed: Mar. 23, 2006

(65) Prior Publication Data

US 2006/0224263 A1 Oct. 5, 2006

(30) Foreign Application Priority Data

Mar. 31, 2005 (JP) ................................. 2005-105477

(51) Int. Cl.
*G06F 19/00* (2006.01)

(52) U.S. Cl.
USPC ............................ 700/112; 438/106; 700/117

(58) Field of Classification Search .................... 700/95, 700/97, 99, 101, 112, 117; 257/59, 72, 443, 257/447, E21.536, E51.001; 349/31, 32, 349/158, 187; 438/106, 110; 445/23, 24, 445/25, 66

See application file for complete search history.

(56) References Cited

U.S. PATENT DOCUMENTS

| | | | |
|---|---|---|---|
| 5,262,954 A | 11/1993 | Fujino et al. | |
| 5,375,061 A * | 12/1994 | Hara et al. | 700/101 |
| 5,544,062 A * | 8/1996 | Johnston, Jr. | 700/117 |
| 5,564,183 A | 10/1996 | Satou et al. | |
| 5,793,638 A * | 8/1998 | Yao et al. | 700/226 |
| 5,818,716 A * | 10/1998 | Chin et al. | 700/100 |
| 6,198,980 B1 * | 3/2001 | Costanza | 700/99 |
| 6,274,508 B1 | 8/2001 | Jacobsen et al. | |
| 6,281,038 B1 * | 8/2001 | Jacobsen et al. | 438/106 |
| 6,496,751 B1 | 12/2002 | Salvo et al. | |
| 6,555,408 B1 | 4/2003 | Jacobsen et al. | |
| 6,665,044 B1 | 12/2003 | Jacobsen et al. | |
| 6,683,663 B1 | 1/2004 | Hadley et al. | |

(Continued)

FOREIGN PATENT DOCUMENTS

| | | |
|---|---|---|
| JP | 04-223846 | 8/1992 |
| JP | 2002-536695 | 10/2002 |

(Continued)

OTHER PUBLICATIONS

Choi et al., "Low-Power Color TFT LCD Display for Hand-Held Embedded Systems", ACM 2002.*

(Continued)

*Primary Examiner* — Carlos Ortiz Rodriguez
(74) *Attorney, Agent, or Firm* — Nixon Peabody LLP; Jeffrey L. Costellia

(57) ABSTRACT

A production system and a production method, which can change a period to delivery of products flexibly depending on a change of demand, in the case of producing a plurality of products having different specifications by mixing. A production system of plural kinds of products has a plurality of lower processes, which is capable of diverging, with respect to an upper process that can be applied common in a plurality of products. These upper process and lower process are organized by including one or a plurality of processes. A production line is constructed by a plurality of manufacturing facilities having different functions through the upper process and the lower process. Such a production system is provided with an order and delivery management system, a design management system, and a process management system.

22 Claims, 24 Drawing Sheets

U.S. PATENT DOCUMENTS

| | | | |
|---|---|---|---|
| 6,731,353 B1 | 5/2004 | Credelle et al. | |
| 6,774,958 B2 * | 8/2004 | Kweon et al. | 349/40 |
| 6,817,008 B2 | 11/2004 | Ledford et al. | |
| 6,850,312 B2 | 2/2005 | Jacobsen et al. | |
| 6,927,085 B2 | 8/2005 | Hadley et al. | |
| 7,006,883 B2 * | 2/2006 | Yamazaki | 700/97 |
| 7,046,328 B2 | 5/2006 | Jacobsen et al. | |
| 7,092,067 B2 | 8/2006 | Kweon et al. | |
| 7,113,250 B2 | 9/2006 | Jacobsen et al. | |
| 7,172,910 B2 | 2/2007 | Hadley et al. | |
| 7,259,802 B2 | 8/2007 | Kweon et al. | |
| 7,277,769 B2 | 10/2007 | Yamazaki | |
| 7,561,221 B2 | 7/2009 | Jacobsen et al. | |
| 2002/0188910 A1 * | 12/2002 | Zizzo | 716/1 |
| 2003/0069658 A1 * | 4/2003 | Yamazaki | 700/97 |
| 2004/0252251 A1 | 12/2004 | Credelle et al. | |
| 2004/0255152 A1 * | 12/2004 | Kanamori et al. | 713/201 |
| 2005/0193353 A1 * | 9/2005 | Malekkhosravi et al. | 716/1 |
| 2006/0012296 A1 * | 1/2006 | Eida et al. | 313/509 |
| 2006/0089852 A1 | 4/2006 | Yamazaki | |

FOREIGN PATENT DOCUMENTS

| | | |
|---|---|---|
| JP | 2003-058225 | 2/2003 |
| JP | 2003-188064 | 7/2003 |
| JP | 2003-208460 | 7/2003 |
| JP | 2003-295219 | 10/2003 |
| WO | WO00/46854 A1 | 8/2000 |

OTHER PUBLICATIONS

Takahashi et al., Full Color Led Display Panel Fabricated on a Silicon Microreflector, IEEE 1997.*

Yoshiko Hara, "Sanyo, Kodak ramp OLED production line", EETimes, Dec. 6, 2001.*

* cited by examiner

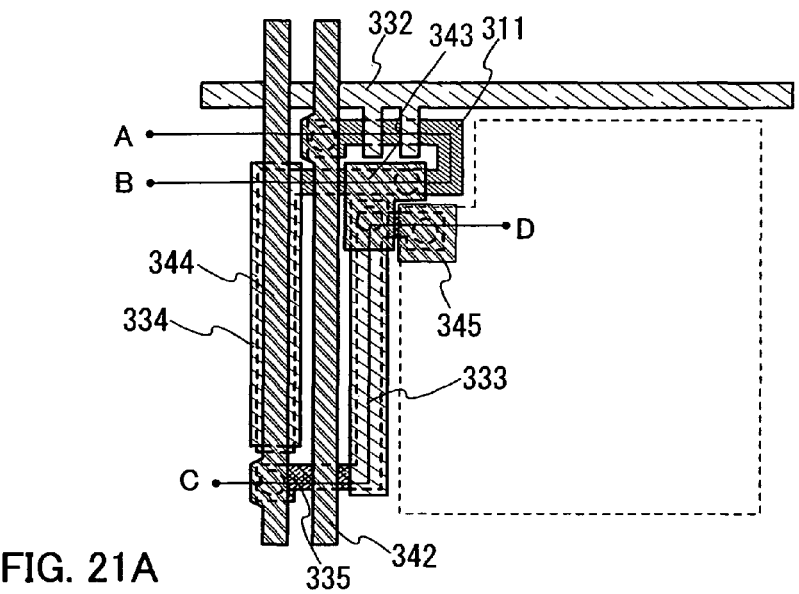
FIG. 21A
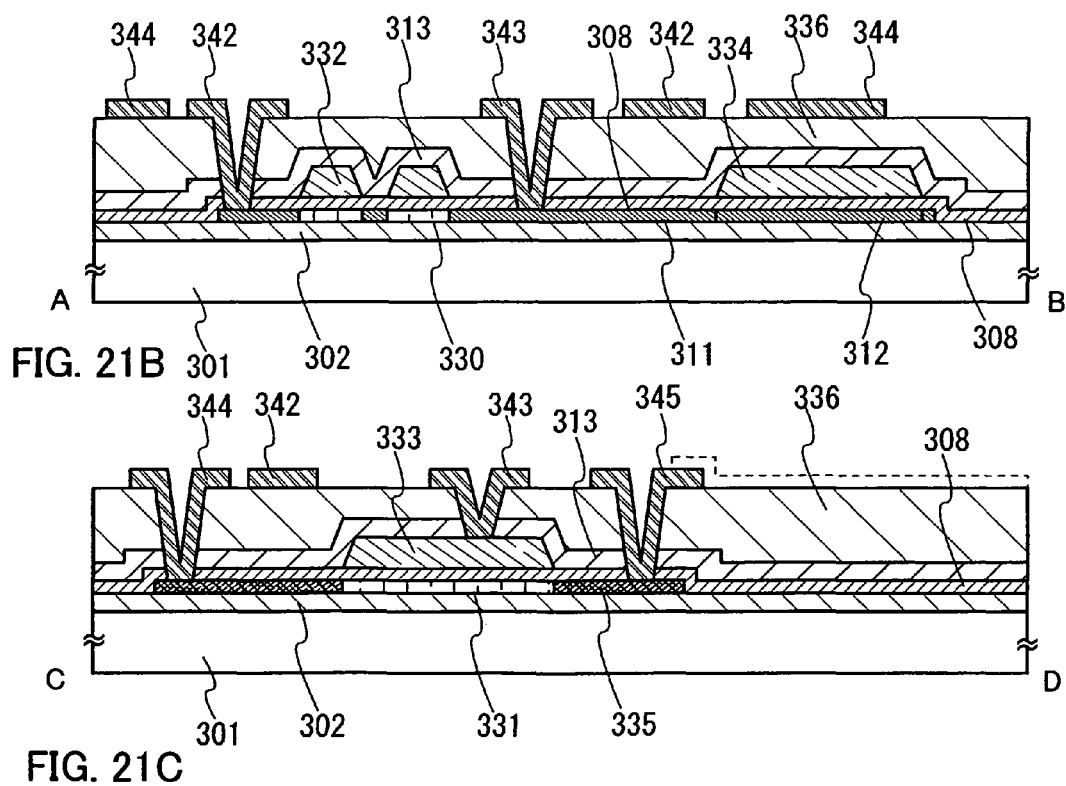
FIG. 21B
FIG. 21C

PRODUCTION SYSTEM AND PRODUCTION METHOD

BACKGROUND OF THE INVENTION

The present invention relates to a production system and a production method for manufacturing a plurality of products having different specifications. The present invention relates to particularly a production system and a production method for manufacturing a plurality of products that include a plurality of processes in which there are plural lower processes, which are capable of diverging, with respect to an upper process.

In order to meet diversification in the market, a limited production of diversified products method is applied in many manufacturing floors. For this method, a production system in mass production products is required to be optimized in order to achieve profit by securing a break-even point of a manufacturing line. Accordingly, measures such as optimization of stock control and sourcing, by utilizing a corporate sources planning system, has been taken (for example, see Patent Document 1).

[Patent Document 1] Japanese Patent Application Laid-Open No. 2003-58225

SUMMARY OF THE INVENTION

In the case of increasing demand steadily, it is easy for producers to accomplish to balance shortening of delivery date to customers and reduction of manufacturing cost by introducing make-to-stock production. However in the case of products having a short life-cycle such as electric apparatuses, which are replaced with new products for about several months to half a year to promote demand, it is extremely difficult to make a production planning for a medium and long term. Further, today when innovation of technology is fast, there is a risk in which obsolescence of products proceeds rapidly. As simple make-to-stock production, there is possibility in which a large quantity of dead stocks is left when demand declines rapidly.

In views of these conditions, it is an object of the present invention to provide a production system and a production method, which can change a period to delivery of products flexibly depending on changing of demand, in the case of producing a plurality of products having different specifications by mixing.

The present invention relates to a production system of plural kinds of products, and has a plurality of lower processes that are capable of diverging with respect to an upper process that can be applied common to a plurality of products. This upper process and lower process are organized by including one or plurality of processes. In the upper process and lower process, a production line is constructed with a plurality of manufacturing facilities having different functions.

The production system according to the present invention includes an order and delivery management system, a design management system, and a process management system.

The order and delivery management system includes an order management means, which sends information such as a kind, quantity, delivery date of order products to an order management means of the process management system. When a kind, a specification, and the like of an order product are new, the order management means sends the information to an order management means of the design management system. The order and delivery management system is provided with a delivery management means in which information of shipment and factory stocks is sent from the process management system.

The design management system includes an IP design means for a system design, a logic design, a layout design, and the like of a new kind; a process design means for a manufacturing-process design based on the IP information; and a design verification means for an verification of the IP design and the process design.

The process management system includes a process organization means for organizing a unity of group called a lot in order to produce products; an adaptive lot searching system for searching existence of process half-finished goods that is adapted to the lot from a process management table; and a process instruction means for giving instructions of a process to a manufacturing management means. Further, the process management system includes the manufacturing management means for managing process half-finished goods and manufacturing facilities over a production line; a shipping management means for managing shipment information such as serial number, quantity, and data of products finishing the manufacturing process to be shipped or semi-manufactured goods; and a stock management means for managing factory stocks.

In accordance with this production system, an instruction of a process change is given to a plurality of products flowing over the production line so that one product specification is adapted to other product specifications depending on a change of its demand with the use of the process organization means, the adaptive lot searching means, and the process instruction means. Therefore, volume of productions of plural kinds of products can be adjusted.

A production method for plural kinds of products according to the present invention is a method, in which plural kinds of products are produced with an upper process including one or a plurality of processes, and a lower process including a plurality of processes. In the upper process, a process that can be applied common to a plurality of products is performed, while in the lower process, a plurality of processes that are capable of diverging depending on each product is performed. A process selected from the lower process is a common process that is compatible even in plural kinds of products, while other processes are exclusive processes in plural kinds of products.

In accordance with this production method, in the lower process, process half-finished goods can be shifted to the other process halfway with respect to a plurality of products flowing over the production line, so that one product specification is adapted to other product specifications depending on a change of its demand. Therefore, volume of production of plural kinds of products can be adjusted.

In accordance with the present invention, a production line, in which a process that can be applied common to production of a plurality of products is provided in an upper process, and a process that is compatible with a unique process in the production of the plurality of productions is arranged in a lower process, is designed. Therefore, productivity can be increased. In other words, volume of production can be adjusted flexibly depending on demand of each product. Therefore, a production corresponding to a demand from customers can be performed without increasing dead stocks or intermediate dead stocks. Further, when demand is inclined to one kind, production can be performed in a state of keeping driving rate of a manufacturing device a fixed quantity to reduce a break-even point.

BRIEF DESCRIPTION OF DRAWINGS

FIGS. 21A to 21C are views showing a manufacturing process of an EL display device in Embodiment 3;

DETAILED DESCRIPTION OF THE INVENTION

Embodiment Mode

Figure 1:
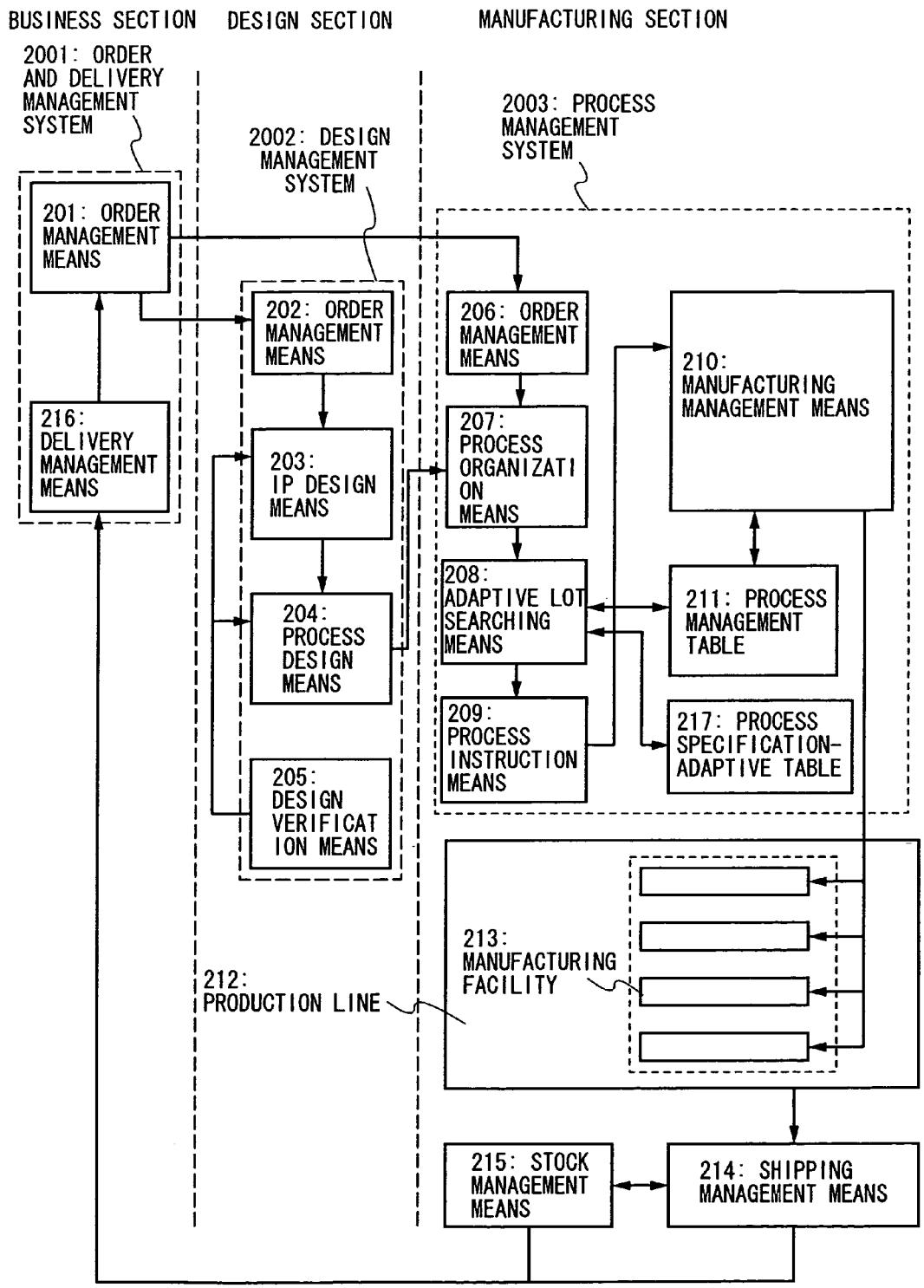
FIG. 1 is a diagram showing one mode of a production system according to the present invention.

Embodiment Mode of the present invention will be described with reference to the accompanying drawings. However, the present invention can be implemented in various modes. It is to be easily understood for those skilled in the art that various changes of modes and details thereof will be possible, unless such changes and modifications depart from the content and the scope of the invention. Therefore, the present invention is not construed as being limited to the description of the present embodiment mode. It is to be noted that the same portion or a portion having the same function is denoted by the same reference numeral in all the drawings below, and the repeat description thereof is omitted.

A production system of plural kinds of products according to the present invention has a structure in which a system having different functions of an order and delivery management system, a design system, and a process management system is networked. These systems are organically combined and have a relation each other. FIG. 1 shows one mode of a production system shown in the present embodiment mode.

FIG. 1 shows each system belonging to a sales section, a design section, and a manufacturing section and a relation thereof. A production system shown in FIG. 1 includes an order and delivery management system 2001, a design management system 2002, and a process management system 2003. The order and delivery management system 2001 belongs to the sales section. The design system 2002 belongs to the design section. The process management system 2003 belongs to the manufacturing section. A designation of these section names is not limited to the mentioned in FIG. 1 as far as the denomination is a functionally similar organization thereto. In addition, these sections belong to one or a plurality of corporations or similar groups, which take manufacturing of plural kinds of productions.

The process management system 2003 includes a manufacturing management means 210, an order management means 206, a process organization means 207, an adaptive lot searching means 208, a process instruction means 209, a process management table 211, and a process specification-adaptive table 217. The manufacturing management means 210 performs an operation management of manufacturing facilities 213 constituting a production line 212 to monitor operation condition of the facilities. The manufacturing facilities 213 include one or a plurality of production machines. The manufacturing management means 210 manages a progress of process half-finished goods over the production line 212. Then the manufacturing management means 210 manages treatment condition so that the process half-finished goods are appropriately processed by the manufacturing facilities 213. In this case, the management includes operation of monitoring whether a program for controlling the manufacturing facilities, a recipe in which treatment condition related to the program is written, and the like are appropriately selected, or operating.

Information controlling this manufacturing management means 210 is given by the process instruction means 209. Information sent from the process instruction means 209 to the manufacturing management means 210 is based on order situation of products sent from the sales section. An order management system 201 in the order and delivery management system 2001 in which order information from customers is inputted, sends order information such as article number, quantity, and delivery date of products to the order management means 206. The order management system 206 provides a function as a database for classifying order information as every product to grasp quantity of order, delivery date, and the like. Information sent form the order management system 201 includes information related to order of various products such as a plurality of products having different functions, products having a same or similar function and different specifications, and products having a same or similar function and a different part of a specification.

The order management means 206 sends information of every product based on the order information to the process organization means 207. In the process organization means 207, information of every product is classified into common specifications, and a unity of a group called a production lot is organized. The production lot indicates a set of same product as a unit in the production. The process organization means 207 selects processes adapting to each production lot from a plurality of processes that are set previously in a process condition table, and distributes the processes to each production lot. Accordingly, a process of each production lot is determined.

By the adaptive lot searching means 208, it is determined whether or not the specification of an order product departs from an adaptive range of the predetermined specification with reference to a process specification-adaptive table 217. Further, the adaptive lot searching means 208 searches existence of an adaptive production lot in process half-finished goods over a production line at that time from the process management table 211 to extract information. Then, the adaptive lot searching means 208 searches existence of a production lot, which is adapted to the production lot organized in the process organization means 207 corresponding to the order products. When there is an adaptive production lot, information related to its number and a progress of the process is sent to the process instruction means 209. The process instruction means 209 determines treatment of the organized production lot. In other words, the process instruction means 209 determines whether a new production lot is adopted, or an appropriate production lot is selected from production lots in process half-finished goods and given. Then, a result thereof is sent to the manufacturing management means 210, and information related to the organization of production lots is provided.

This operation works effectively when plural kinds of lots are flowing constantly over the production line at a constant rate in make-to-stock production. In other words, when there is a production lot corresponding to the order product in process half-finished goods, by adapting the production lot to the order product, it is not required to perform processes from the beginning so that the process period is shorten. Therefore, a delivery date of the order product can be accelerated. Further, when only order production is performed, the adaptive lot searching means 208 can be omitted. However, when a delivery date of order goods is given top priority and a preceding order lot is replaced by a subsequent order lot that has priority in a delivery date, the adaptive lot searching means 208 can be effectively utilized.

A shipping management of goods finishing a manufacturing process is performed by a shipping management means 214. In addition, a stock management means 215 for managing stocks is also provided. The shipping management means 214 and the stock management means 215 can communicate with a delivery management means 216 of the sales section mutually. In such a manner, distribution management of goods can be performed.

When an order product is special specification goods or new specification goods, information of the product specification thereof is sent to an order management means 202 belonging to the design management system 2002 of the design section. The order management means 202 classifies the order information as every product and every specification to generate new product number. An IP design means 203 performs a system design, a logic design, a layout design, and the like, which are corresponding to specifications of the order product, by obtaining information from the order management means 202. In the IP design means 203, a database systematizing information of a past IP design is formed to perform design more effectively. A process design means 204 for design of a manufacturing process is provided by being based on such IP information. A process organization data of the process design means 204 with corresponding product code number is sent to the manufacturing section. The process organization means 207 can organize a new process based on the process organization data. The new process is registered in the process management table.

A design verification means 205 inspects design conducted in the IP design means 203 and the process design means 204 to examine whether there is no error. A process design data of new specification goods is sent to the process organization means 207 belonging to the manufacturing section, and the process is to be processed in the manufacturing section. In such a manner, the design section has a function for designing products of a new specification. The order management means 202, the IP design means 203, the process design means 204, the process organization means 207, and the like can show functions thereof by computers. The computers thereof are connected by a line and can send and receive data mutually.

In the process management system 2003, a flow of treatment of a process organization, a lot organization, a process instruction, and the like from receiving information of an order product, is described with reference to FIG. 2. In the following description, the production system shown in FIG. 1 is also referred concurrently.

In a step 20, information of an order specification is inputted into the process organization means 207 from the order management means 206. In a step 21, the order specification is organized to prearrange the process design.

In a step 22, a specification of an order product is determined. In this step, it is determined whether or not the specification of an order product departs from an adaptive range of the predetermined specification with reference to a process specification-adaptive table 39 (which is the same as a process specification-adaptive table 217 in FIG. 1, and hereinafter, the process specification-adaptive table in FIG. 2 indicates the same one). If unconformity of the specification is found in this step, a warning display 42 is operated to display messages for promoting confirmation of information of the order specification and reconfirmation of the specification.

In a step 23, process design that is based on a defined production specification is performed. The process design is assembled with reference to a process condition table 40. At this time, information of a compatibility process is added by including a process that is capable of having compatibility with other products with performing basic process design.

In a step 24, a specification code is formed in accordance with a fixed rule, which is based on the information of process design. As the specification code, one specification code is determined by combining each process included in an upper process and a lower process. When the process begins, this code is registered in the process management table 211 to be used for searching half-finished goods over the production line and the like.

Operations from the step 20 to the step 24 are performed in the process organization means 207. Then, a production lot corresponding to the order product is organized.

In a step 25, a lot data in a process, which is flowing over the production line, is searched with reference to a process management table 41 (which is the same as the process management table 211 in FIG. 1, and hereinafter, the process management table 41 described in FIG. 2 indicates the same one). In the lot data of the process management table 41, a specification code is distributed by the same rule as that of the step 24, and the date is obtained. The specification code given to the lot is a scheduled specification code, and therefore, there is a case where the code is different from a specification code given by a process processed in practice. The both codes are obtained here.

In a step 26, existence of a production lot that is adapted to the production lot organized by the step 24 over the production line is examined. In addition, in the case of where there is an adaptive production lot, operation of obtaining information of its number and a progress of the process is performed.

In a step 27, the adaptive lot is extracted. The existence of the adaptive lot is searched with reference to the specification code that is determined from the process design and the specification code of the production lot over the production line. At this time, adaptability of the specification code that is determined from the process design and the specification code of the production lot over the production line, is determined with reference to a process specification-adaptive table 39. When there is no adaptive lot as a result, a new input instruction 43 is operated. It is not required that number of a lot extracted here is just one. If there are adapting lots, a plurality of lots can be selected as candidate lots.

In a step 28, it is determined whether there is a priority objective in order situation from customers. If there is a priority objective, a step 31 starts. If there is no priority objective, a step 29 starts.

In the step 29, a lot that has a corresponding specification or a lot that has a high degree of the corresponding specification with reference to the process management table 41 is selected. Then, a process instruction 30 is performed to the process management system.

If it is determined that there is a priority objective in the step 28, the step 31 starts. In the step 31, the most suitable lot in the extracted production lots is selected from the process management table 41. At this time, a priority objective such as quantity and delivery date from a demand of customers and adaptability between the order specification process and the lots are determined comprehensively. When there is an adaptive lot, the step 32 starts to give a process instruction.

If there is no adaptive lot in the step 31, a step 33 starts. In the case where quantity of delivery is to be a priority objective here, operation of reorganizing the adaptive lot is performed with reference to the process management table 41. Therefore, a new lot is organized. In the case of organizing a reorganized lot, a step 37 starts to form information of the reorganized lot. Then, a step 38 starts to give a process instruction.

Further, in the case where the reorganization lot cannot be organized in the step 33, a step 34 starts to determine whether a new input lot is required or not. If it is determined that a new lot is not inputted, a step 36 starts to relax the priority objective, and then, the treatment flow returns to the step 31. If it is determined that the new input lot is required, a step 35 starts to give an instruction of inputting a new lot.

In the above treatment, operation of extracting the adaptive lot is performed by the adaptive lot searching means 208, and a process instruction is performed by the process instruction means 209.

Figure 2:
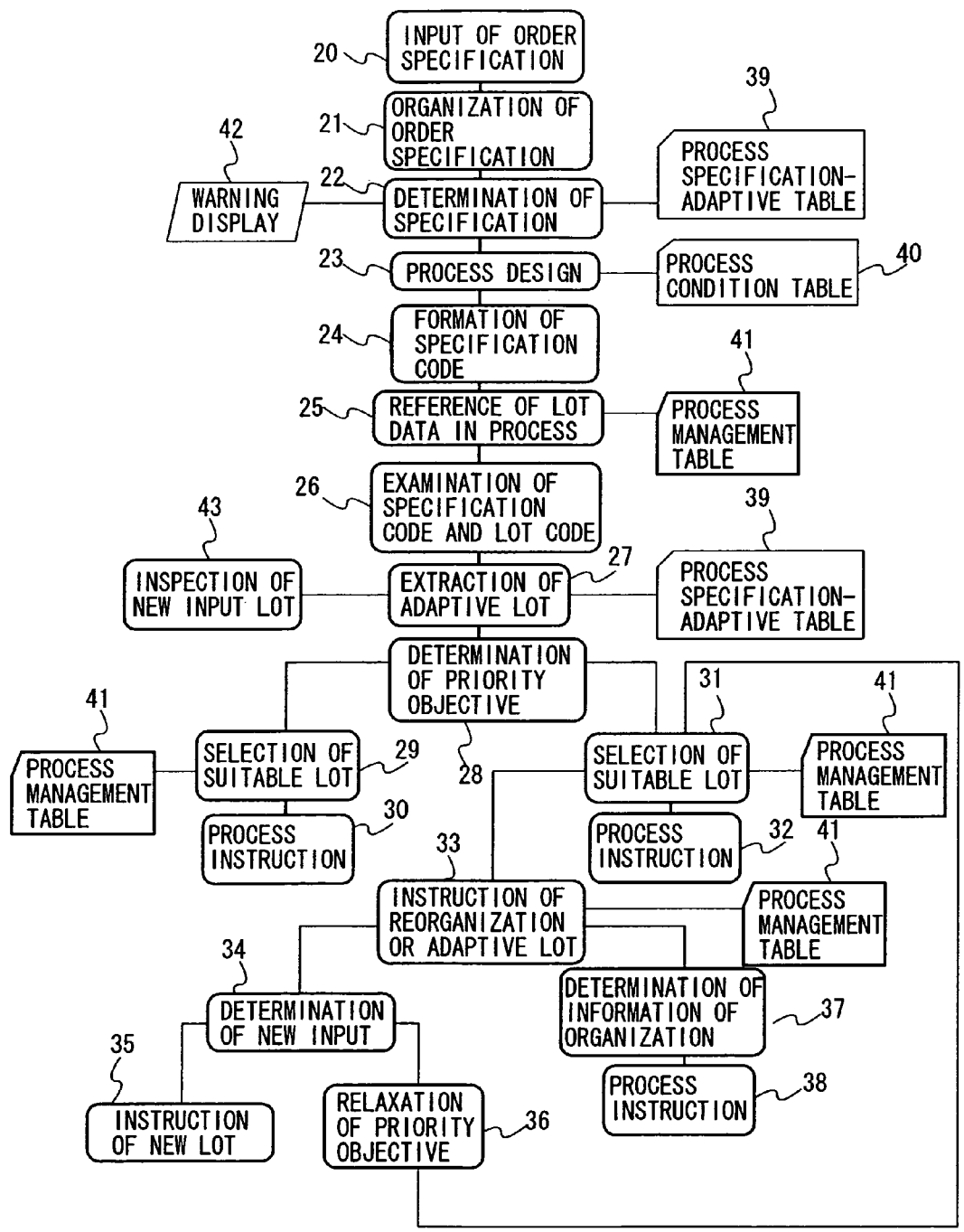
FIG. 2 is a diagram showing a flow of treatment such as a process organization, a lot organization, and a process instruction from information of an order production.

In accordance with the treatment shown in FIG. 2, a product for meeting a demand from customers or an intermediate product can be conveniently provided by modifying flexibly treatment condition of a lot flowing over the production line. For example, in a flowing production method, a lot proceeds to a specific process and stocked for a certain period so that a lot for meeting a demand from customers can be appropriately organized and a period from an order to a delivery can be shortened. In addition, a driving rate of a manufacturing device can be increased.

Figure 3:
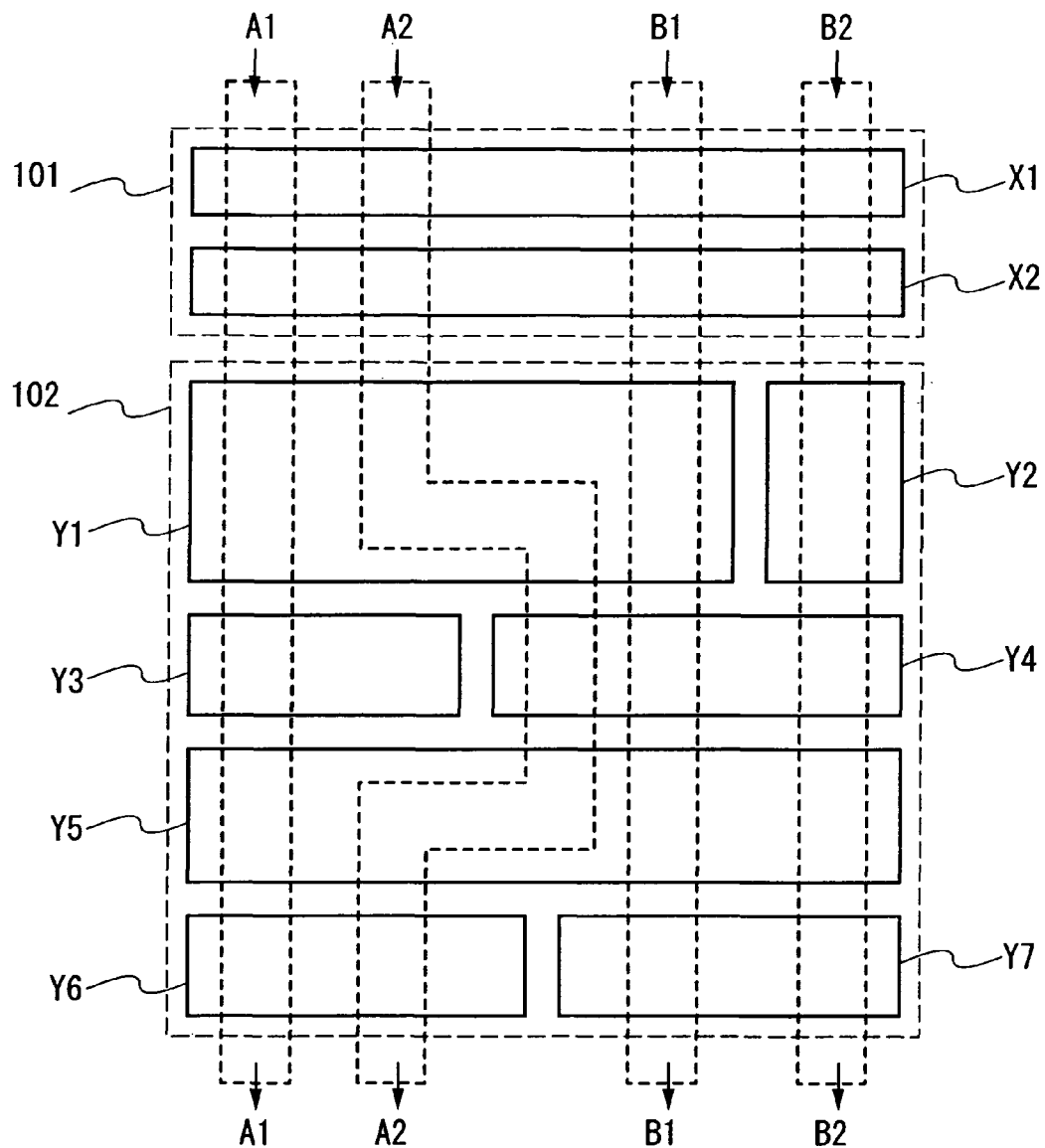
FIG. 3 is a diagram schematically showing an upper process that can be applied common to a plurality of products and a plurality of lower processes that feature a structure of each product.

The manufacturing process according to the production system described with references to FIG. 1 and FIG. 2 has an upper process that can be applied common in a plurality of products, and a plurality of lower processes that are capable of diverging. FIG. 3 shows schematically an upper process 101 that can be applied common in a plurality of products (A1, A2, B1, and B2), and a plurality of lower processes 102 that features a structure of each product. Products A and products B have same or similar function and different specifications here. Further, a product A1 and a product A2 are the same product having specification partly different from each other. A different part of specification indicates a mode in which a part of the product has a different outward structure or internal structure, or a mode in which the products have the same structure and different components.

The upper process 101 includes one or a plurality of processes. A process X1 and a process X2 are applied common in a plurality of products (A1, A2, B1, and B2) flowing over this production system. Accordingly, in this step, the plurality of products (A1, A2, B1, and B2) is processed under the same condition by the process X1 and the process X2. The lower process 102 includes one or a plurality of processes. The lower process 102 includes a process Y1, a process Y2, a process Y3, a process Y4, a process Y5, a process Y6, and a process Y7. Theses processes feature a structure of the product A and the product B, and some processes can be applied to only one of the product A and the product B. Accordingly, the process Y1, the process Y3, the process Y4, the process Y5, and the process Y6 can be applied to the product A; however, other processes can not be applied. Further, the process Y1, the process Y2, the process Y4, the process Y5, and the process Y7 can be applied to the product B; however, other processes cannot be applied. The lower process 102 includes the process Y1, the process Y4, and the process Y5 that have compatibility between the product A and the product B. In particular, the process Y5 can be applied to the product A and the product B in common. Further, the process Y3 and the process Y6 can be applied to only the product A, and the process Y2 and the process Y7 can be applied to only the product B.

Figure 4:
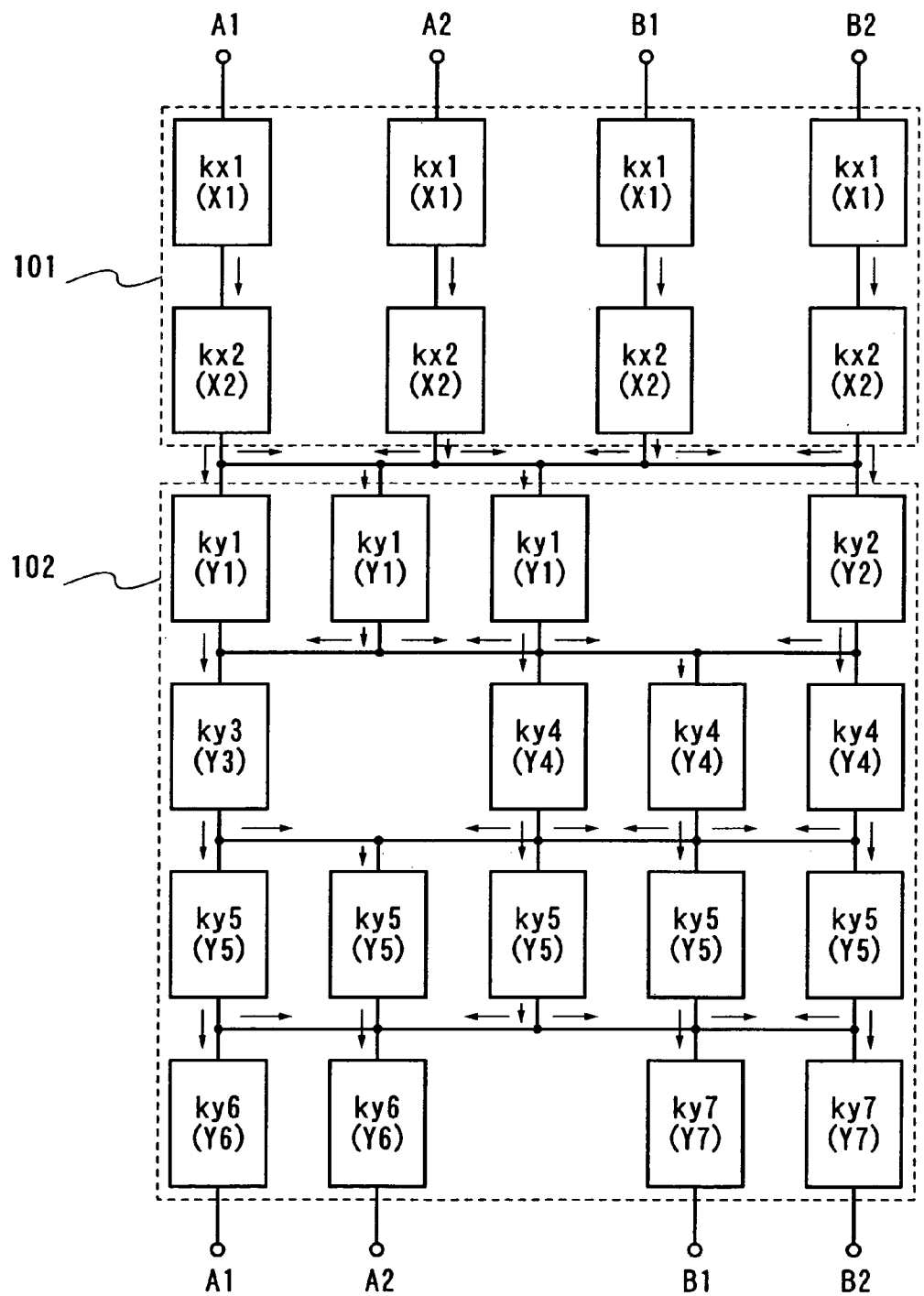
FIG. 4 is a diagram showing arrangement of production equipments in each process.

The process X1, the process X2, and the processes Y1 to Y7 are formed by equipment serving production corresponding to each process. FIG. 4 shows arrangement of production equipment in each process. Production equipment k×n (n=1, 2) is provided in a process Xn (n=1, 2), and production equipment kyn (n=1 to 7) is provided in a process Yn (n=1 to 7). Each production equipment may be arranged to correspond to a load of each process and production capacity of the production equipment. Accordingly, in a process having commonality between the product A and the product B (for example, the process X1, the process X2, the process Y1, the process Y5, and the like), the production equipment is arranged to correspond to the production load and the production capacity.

FIG. 4 shows a production system including four production lines; however, a boundary between one production line and another production line is not necessarily clear by providing a common process in a production process of a plural different products. As process design of such a production line, a process that can be applied common to the product A and the product B is provided in an upper process; and a specific process and a process, which is compatible, for manufacturing a plural kinds of products are arranged in a lower process. Therefore, arrangement of such a production line makes it possible that volume of production is flexibly adjusted depending on demand of the product A and the product B.

In such a manner, a production line is designed in which a process that can be applied in common to manufacture a plurality of products (A1, A2, B1, and B2) is provided in an upper process; and a specific process and a process that is compatible for manufacturing the plurality of products (A1, A2, B1, and B2) are arranged in a lower process so that productivity can be risen. For example, volume of production can be adjusted with keeping a driving rate of a production machine a constant level depending on demand of the product A and the product B. Accordingly, a lot can be flexibly replaced depending on demand and delivery of the product A or the product B. Therefore, production for meeting demands from customers is possible without increasing dead stocks or dead intermediate stocks. Further, when demand is inclined to one kind, production can be performed in a state of keeping driving rate of a manufacturing device a fixed quantity to reduce a break-even point.

Figure 5:
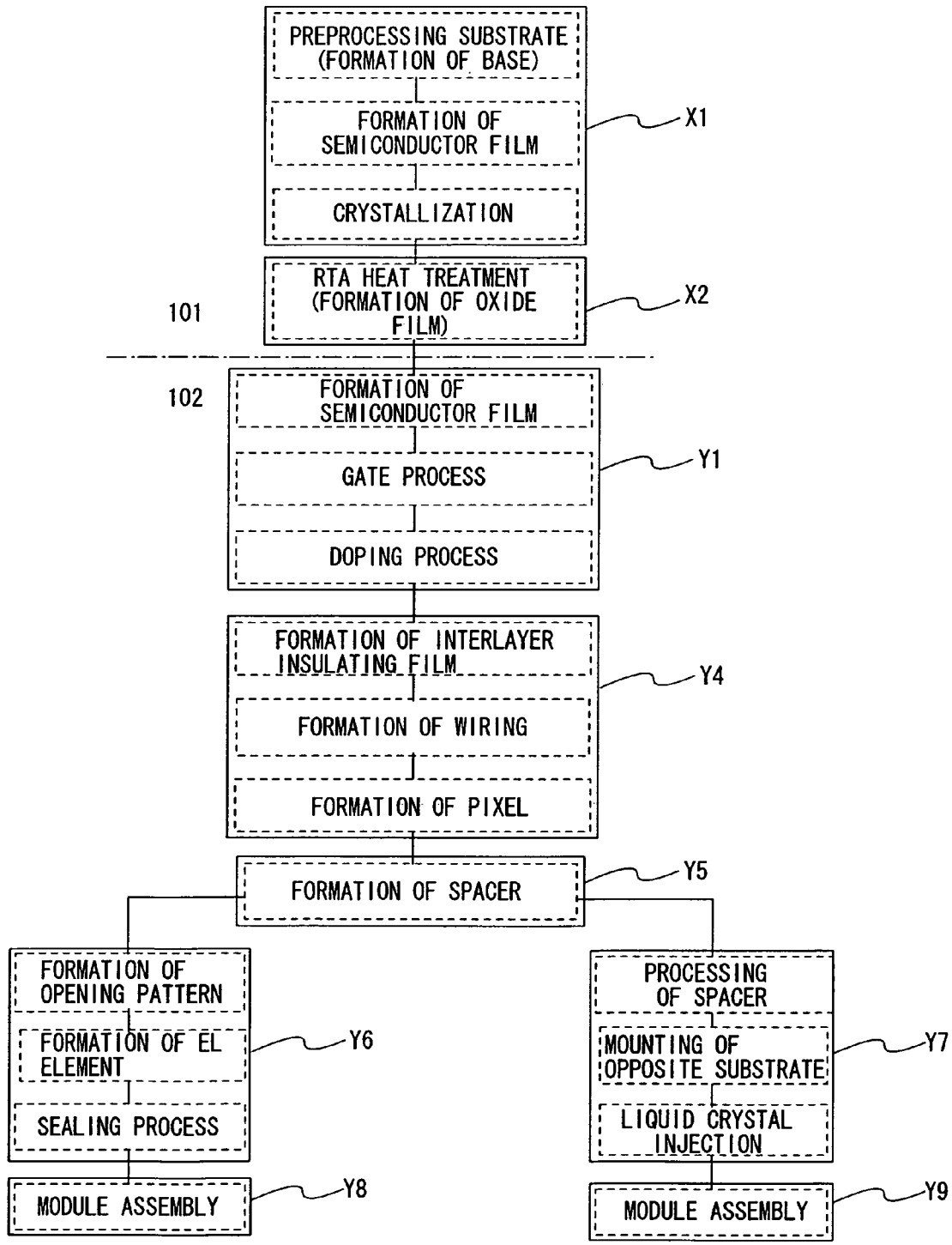
FIG. 5 is a diagram illustrating a manufacturing process of a display panel in which the process based on FIG. 3 is organized.
Figure 6:
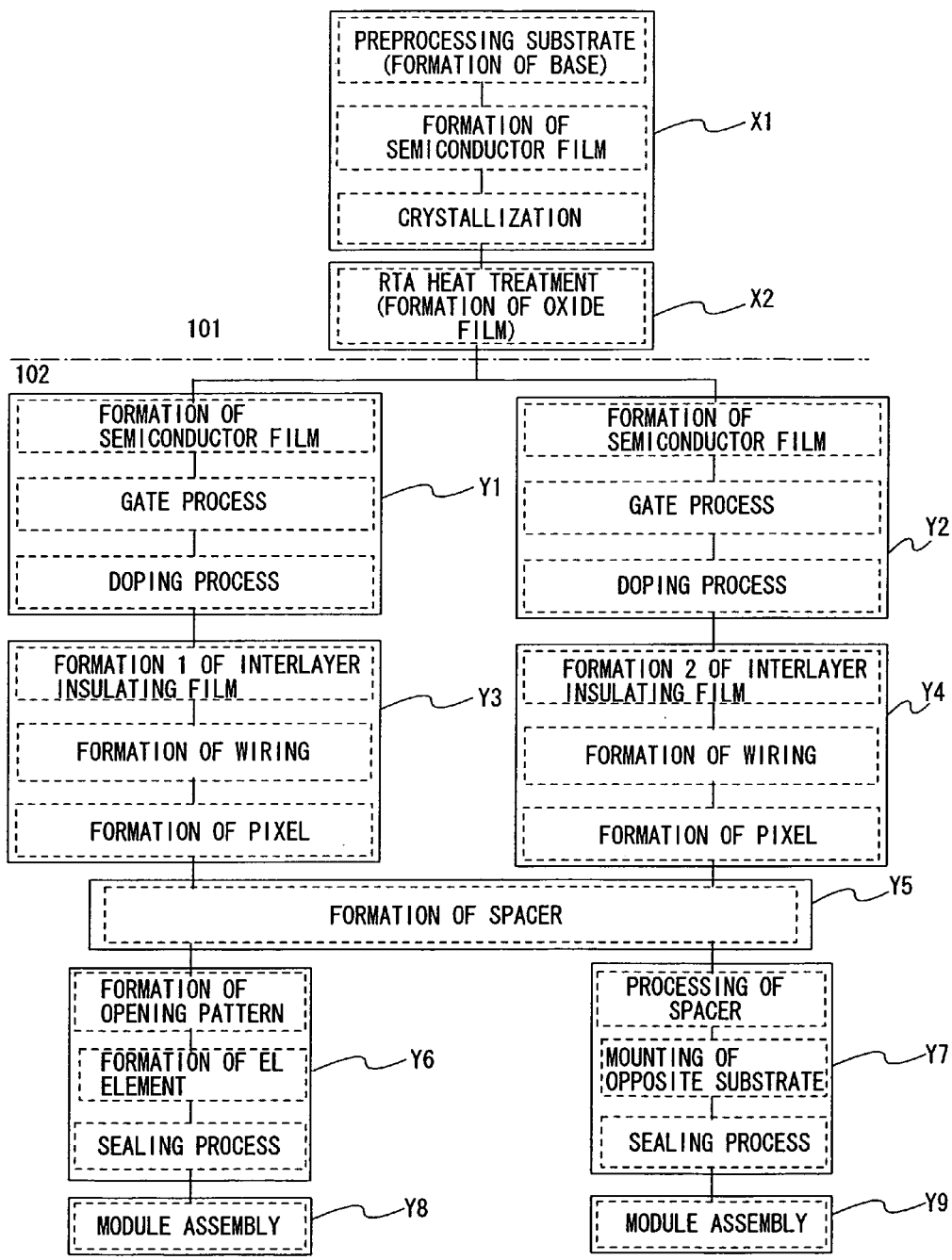
FIG. 6 is a diagram illustrating a manufacturing process of a display panel in which the process based on FIG. 3 is organized.
Figure 7:
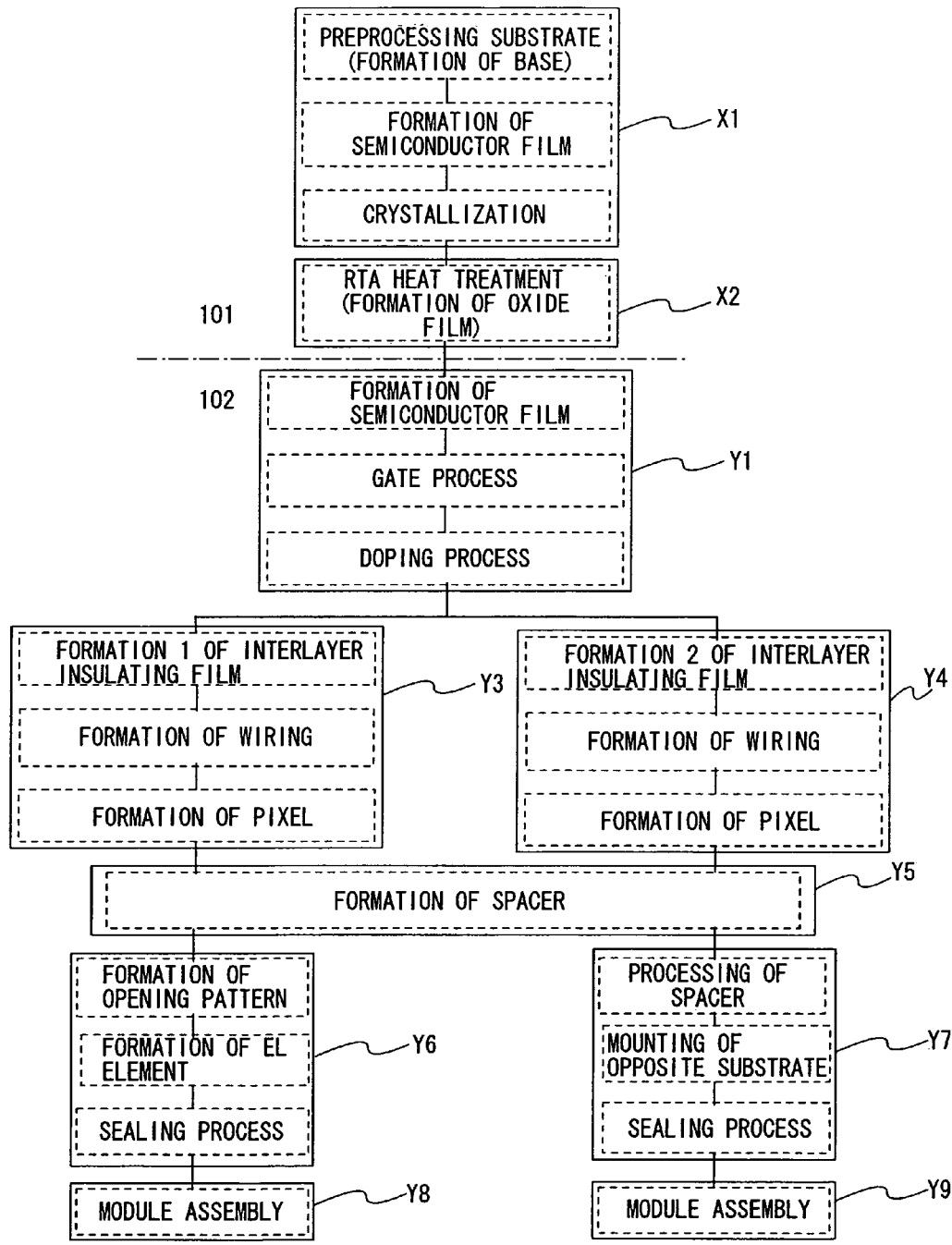
FIG. 7 is a diagram illustrating a manufacturing process of a display panel in which the process based on FIG. 3 is organized.

FIG. 5, FIG. 6, and FIG. 7 illustrate a manufacturing process of a display panel in which a process based on FIG. 3 is organized. A product illustrated here is a display panel formed by using a thin film transistor. It is possible to provide a display panel having different specifications by combining a pixel circuit, which is formed by the thin film transistor, with a liquid crystal element or light emitting element.

A case where the products A1 and A2 shown in FIG. 3 are a light emitting display device in which a TFT panel and a light emitting element are combined, and the products B1 and B2 are a liquid crystal display device in which a TFT panel and a liquid crystal element are combined, is shown here.

FIG. 5 illustrates a process for manufacturing a product A2 and a product B1. An upper process 101 includes a process X1 and a process X2 that are applied common to the product A2 and the product B1. A lower process 102 includes a process Y1, a process Y4, and a process Y5 that are applied common to the product A2 and the product B1. In addition, the lower process 102 includes a process Y6 that is applied to the product A2 and a process Y7 that is applied to the product B1. A process shown in FIG. 5 shows a case where the product A2 and the product B1 are manufactured by a common process as the upper process 101 and halfway the lower process 102. A characteristic part of the product A2 and the product B1 are to be formed in the process Y6 and the process Y7 that are last processes. Accordingly, a common manufacturing process of a TFT panel is provided, and processes for forming a display medium that utilizes electric and optical characteristics thereto are provided separately. The process Y1 and the process Y4 in the lower process 102 are common processes in the product A2 and the product B1. In this case, distribution of the process after the process Y5 can be flexibly changed by corresponding to demand of the product A2 and the product B1.

The process X1 includes a process for preprocessing a substrate, a process for forming a semiconductor film, and a process for crystallizing for manufacturing a TFT panel. The process X2 includes a process for forming an oxide film. The process Y1 includes a process for shaping a semiconductor film, a gate process, and a doping process. The process Y4 includes a process for forming an interlayer insulating film, a process for forming a wiring, and a process for forming a pixel. The process Y5 includes a process for forming a spacer. The process Y6 that is applied to the product A2 includes a process for forming an opening pattern, a process for heat-treatment, a process for forming an EL element, and a sealing process; and the process Y8 that is also applied to the product A2 includes a process for assembling a module. The process Y7 that is applied to the product B1 includes a process for processing a spacer, a process for mounting an opposite substrate, and a process for injecting liquid crystal; and the process Y9 that is also applied to the product B1 includes a process for assembling a module.

FIG. 6 illustrates a process for manufacturing a product A1 and a product B2. An upper process 101 includes a process X1 and a process X2 that are applied in common to the product A1 and the product B2. A lower process 102 includes a process Y1, a process Y3, and a process Y6 that are applied to the product A1; and a process Y2, a process Y4, and a process Y7 that are applied to the product B2. In addition, the lower process 102 includes a process Y8 that is applied to the product A1, and a process Y9 that is applied to the product B2.

The process Y2 has the same content as the process Y1; however, details such as a process for shaping a semiconductor film and a gate process are different from each other. For example, in the process for shaping a semiconductor film, number of transistors, a circuit structure of a driving circuit, and the like formed over one pixel are different to correspond to a specification of a product. The process Y3 also has the same content as the process Y4; however, a layer structure in a process forming an interlayer insulating film, a wiring pattern and a multilayer structure of a wiring in a process for forming a wiring, and the like are different from each other. In processes shown in FIG. 6, a process Y5 is a common process to the product A1 and the product B2. In this case, half-finished goods through the process Y1, the process Y3, and the process Y5, which are a process of the product A, can be distributed to the process Y7 to complete a product B2' by corresponding to the design specification of the product A1 and the product B2.

FIG. 7 illustrates a process for manufacturing a product A1 and a product B1. An upper process 101 includes a process X1 and a process X2 that are applied in common to the product A1 and the product B1. A lower process 102 includes a process Y1 that is applied in common to the product A1 and the product B1; a process Y3 and a process Y6 that are applied to the product A1; and a process Y4 and a process Y7 that are applied to the product B1. In addition, the lower process 102 includes a process Y8 that is applied to the product A1, and a process Y9 that is applied to the product B1.

In FIG. 7, the process Y1 in the lower process 102 is a common process to the product A1 and the product B1. In this case, distribution after the process Y1 can be changed flexibly depending on demand of the product A1 and the product B1.

A process for forming a liquid crystal display panel and an EL display panel will be described by embodiments as following description.

[Embodiment 1]

In the present embodiment, one example of producing different kinds of display devices over a same production line will be described. A display device manufactured here forms a display screen by arranging pixels in a matrix. As a specific example, a case of producing a liquid crystal display device and an EL display device is shown.

The liquid crystal display device displays a picture by utilizing electro-optic characteristics of a liquid crystal by corresponding to an electric signal that is applied to a pixel. The EL display device displays a picture by utilizing a change of luminance from emission of light and non-emission of light of a light emitting element forming a pixel.

In the present embodiment, the above display devices are formed by using a thin film transistor in which a channel forming region is formed by using a semiconductor film. The thin film transistor is provided in a pixel to control a signal inputted to the pixel. Further, the thin film transistor can be used to form a driving circuit that controls a thin film transistor provided in a pixel. Thus, the present embodiment shows a display device formed by combining an element substrate provided with a pixel by a thin film transistor or an element substrate provided with a pixel and a driving circuit by a thin film transistor; and a liquid crystal element or a light emitting element.

A manufacturing process of these display devices includes a process for forming a semiconductor layer, a process for forming a thin film transistor, a process for forming an interlayer insulating layer over the thin film transistor, and a process for forming a liquid crystal element or a light emitting element.

When these processes are applied to FIG. 3, the process for forming a semiconductor layer is a common process to be included in the lower process 101. The process for forming a thin film transistor is common in which a thin film transistor having the same structure can be used, for a liquid crystal display device and an EL display device. However, there is a case where arrangement of the thin film transistor, in other word, a circuit structure, is different. Therefore, the process for forming a thin film transistor is included in the lower process 102. The process for forming an interlayer insulating layer over the thin film transistor and the process for forming a liquid crystal element or a light emitting element are similarly included in the lower process 102.

A process related to the liquid crystal display device and the EL display device can be described by applying to FIG. 5. In this case, a process X1, which is applied common to the liquid crystal display device and the EL display device to manufacture a TFT panel, is a process for preprocessing a substrate, a process for forming a semiconductor film, and a process for crystallization. A process X2 is a process for forming an oxide film. The lower process 102 includes a process Y1, a process Y4, and a process Y5 that are applied common to the liquid crystal display device and the EL display device. The process Y1 is a process for shaping a semiconductor film, a gate process, and a doping process. The process Y4 includes a process for forming an interlayer insulating film, a process for forming a wiring, and a process for forming a pixel. The process Y5 is a process for forming a spacer insulating film. Further, a process Y7 that is applied to the liquid crystal display device includes a process for processing a spacer, a process for mounting an opposite substrate, and a process for injecting liquid crystal. A process Y9 is a process for assembling a module. Further, a process Y6 that is applied to the EL display device includes a process for forming an opening pattern, a process for heat treatment, a process for forming an EL element, and a sealing process. A process Y8 is a process for assembling a module.

In a case of FIG. 6, a process X1 and a process X2 that are applied common to the manufacturing processes of the liquid crystal display device and the EL display device, is the same as the case of FIG. 5. In the lower process, a process Y1 includes a process for shaping a semiconductor film, a gate process, and a doping process. A process Y2 that is applied to the EL display device has the same content as the process Y1; however, details such as the process for shaping a semiconductor film and the gate process in the process Y2 is different from those in the process Y1. Specifically, the number of transistors provided in one pixel is different. A process Y3 includes a process for forming an interlayer insulating film, a process for forming a wiring, and a process for forming a pixel. A process Y4 has the same content as the process Y3; however, details such as a layer structure in the process for forming an interlayer insulating film, a wiring pattern and a multilayer structure of a wiring in the process for forming a wiring are different from those of the process Y3. A process Y5 that forms a spacer insulating film is a common process in the liquid crystal display device and the EL display device. In this case, a process after the process Y5 can be selected by corresponding to a design specification of the liquid crystal display device and the EL display device. Accordingly, it is possible to perform treatment in which half-finished goods for the EL display device that has flowed through the process Y1 and the process Y3 are shifted to flow in the process Y7 and the process Y9 after the process Y5 in the lower process 102 so that the liquid crystal display device is finally manufactured.

In a case of FIG. 7, a process X1 and the process X2 that are applied common and a process Y1 in a lower process for the manufacturing process of the liquid crystal display device and the EL display device are the same as the case of FIG. 5. As a difference with FIG. 6, the process Y1 is a common process for the liquid crystal display device and the EL display device. Specifically, the number of transistors provided in one pixel is the same. After the process Y1, processes are divided for each product and have the same content as FIG. 6. Accordingly, a flow of processes after the process Y5 can be freely selected from a case of flowing the half-finished goods to the process Y6 and the process Y8 that are assembling processes of the EL display device; and a case of flowing of half-finished goods to the process Y7 and the process Y9 that are an assembling processes of the liquid crystal display device.

[Embodiment 2]

Details of a process for manufacturing a display device will be shown is based on Embodiment 1. The present embodiment illustrates a process for manufacturing a liquid crystal display device. This manufacturing process includes a process for manufacturing a thin film transistor and a process for manufacturing a liquid crystal element.

Figure 8A:
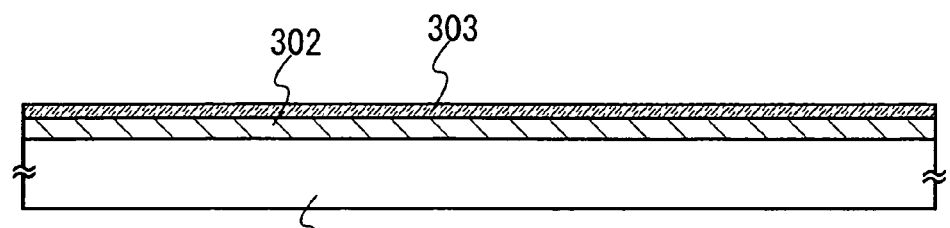
FIGS. 8A to 8C are views showing a process (X1) for forming a semiconductor layer.
Figure 8B:
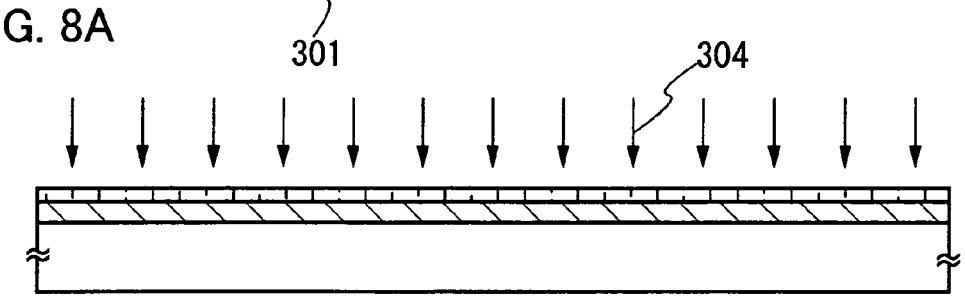
Figure 8C:
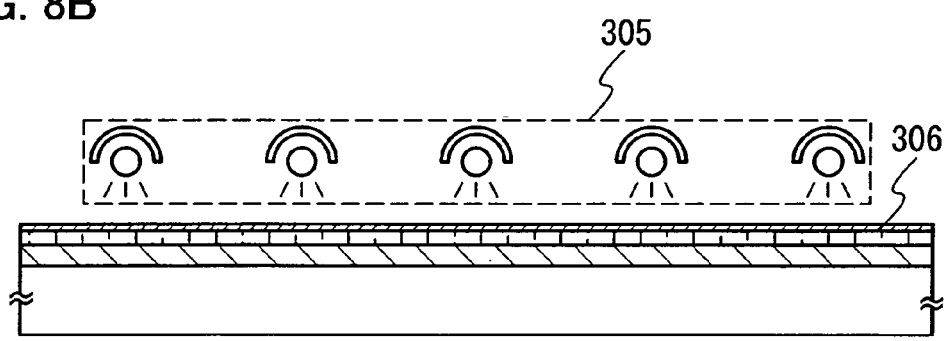

FIGS. 8A to 8C show a process (X1) for forming a semiconductor layer. This process is categorized into the upper process 101 in FIG. 6. This process for forming a semiconductor layer is described with reference to FIGS. 8A to 8C. In FIG. 8A, a blocking layer 302 and a semiconductor layer 303 are formed over a glass substrate 301. The blocking layer 302 is provided between the glass substrate 301 and the semiconductor layer 303 to prevent pollution of the semiconductor layer 303. The semiconductor layer 303 is formed by a thin film-formation method such as low pressure chemical vapor deposition (CVD), plasma CVD, or sputtering. The semiconductor layer 303 is an amorphous semiconductor or a polycrystalline semiconductor. In the case of using a thin film transistor as a switching element of a pixel in a display device to be manufactured, the semiconductor layer 303 may be an amorphous semiconductor. In the case of integrating a driving circuit, a polycrystalline semiconductor is preferably used.

The above is all for the process for forming a semiconductor layer. In the case where an amorphous semiconductor is formed and then polycrystallized by crystallizing, a process of FIG. 8B is performed. In this process, an amorphous semiconductor is crystallized by irradiation of a laser beam 304. The laser beam 304 is pulsed light or continuous light, and a gas laser typified by an excimer laser or a solid laser typified by a YAG laser is used as a light source. By this treatment, the polycrystalline semiconductor layer 303 becomes poly-crystallized. Further, a method for crystallization is not limited to this. A method for crystallization by heat treatment at 450 to 750° C. by adding a small amount of metal, or a method for crystallization by heat treatment at 600 to 1000° C. may be employed.

FIG. 8C shows a process for performing heat-treatment that is intended for stress relaxation of the polycrystalline semiconductor layer 303. Further, an oxide film 306 is formed, which is intended to protect a surface of the polycrystalline semiconductor layer 303. In this treatment, heating is performed by a heat treatment means 305 with a heat treatment temperature at 500 to 950° C. As a heat treatment means, furnace annealing, lamp annealing, rapid thermal annealing (RTA), or the like is used. This purpose is to keep the substrate as goods in stocks after forming the semiconductor layer and to supply the substrate from these stocks to a lower process according to need. In the case of manufacturing plural kinds of products, the upper process is made to be a common process so that the substrate can flow constantly over the production line. Accordingly, the substrate of half-finished goods can be distributed into the lower process corresponding to demand with stabilization of quality, and it is possible to be flexible with volume of production.

Figure 9A:
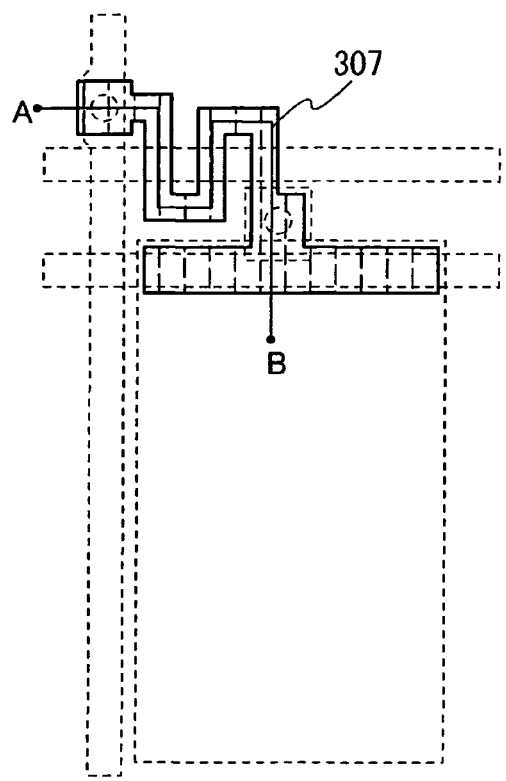
FIGS. 9A and 9B are views showing a manufacturing process of a liquid crystal display device in Embodiment 2.
Figure 9B:
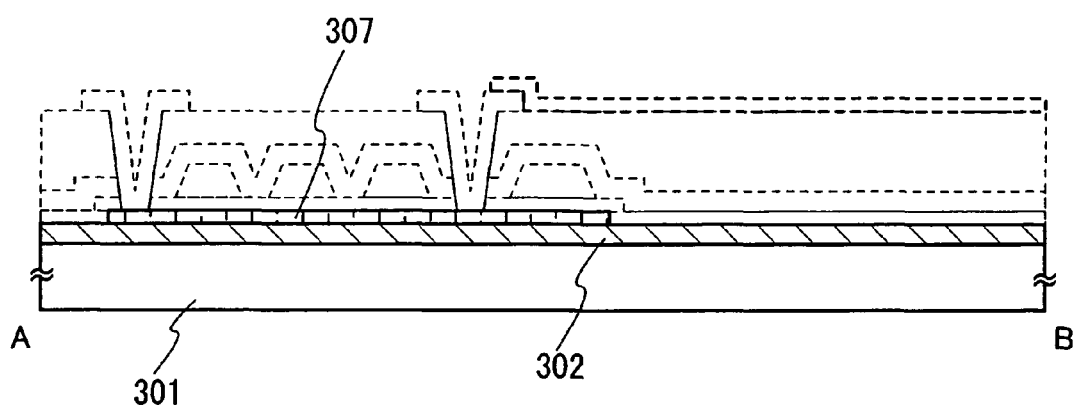

FIGS. 9A and 9B, FIGS. 10A and 10B, FIGS. 11A and 11B, and FIGS. 12A and 12B show a process for manufacturing a liquid crystal display device, and one embodiment of the process Y2 and the process Y4 in the lower process 102 in FIG. 6. In these processes, a substrate to which the semiconductor layer 303 formed in the upper process is attached, is used. In the process Y2, a TFT is formed, and a process for shaping a semiconductor layer, a gate process, and a doping process are included. In the process for shaping a semiconductor layer, a semiconductor layer 307 of a thin film transistor provided in a pixel is formed by etching the semiconductor layer, which is shown in FIGS. 9A and 9B. The semiconductor layer 307 is formed to have a predetermined shape so that an impurity region and a channel forming region that form a source and a drain are formed. In addition to a transistor, a patterning forming another element such as a capacity portion may be included. FIGS. 9A and 9B show a structure in which one thin film transistor is arranged in one pixel; however, the number of thin film transistors in each pixel is not limited in a purpose for driving a liquid crystal element. A shape of the semiconductor layer 307 is also arbitrary. It is to be noted that FIG. 9A is a top view of a pixel and FIG. 9B is a view showing a cross-sectional structure along A-B, and same references are used in common. Hereinafter, the same applies to FIGS. 10A and 10B, FIGS. 11A and 11B, and FIGS. 12A and 12B.

Figure 10A:
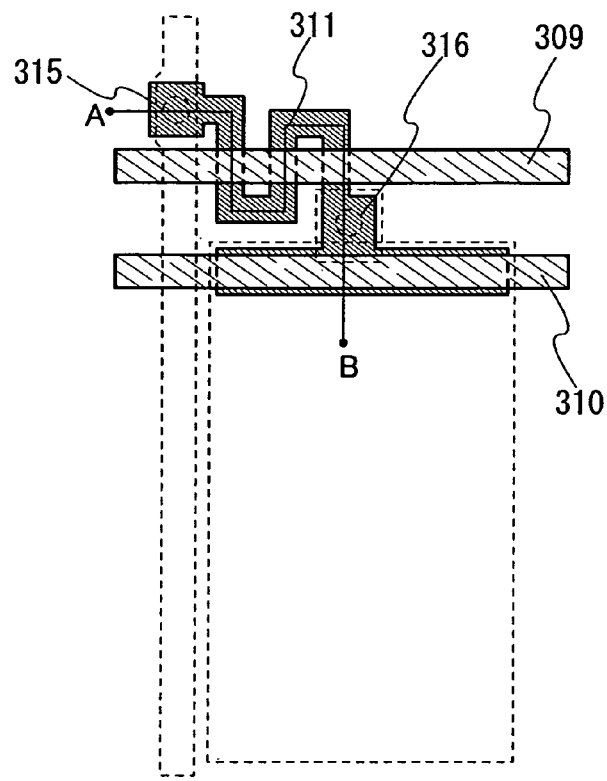
FIGS. 10A and 10B are views showing a manufacturing process of a liquid crystal display device in Embodiment 2.
Figure 10B:
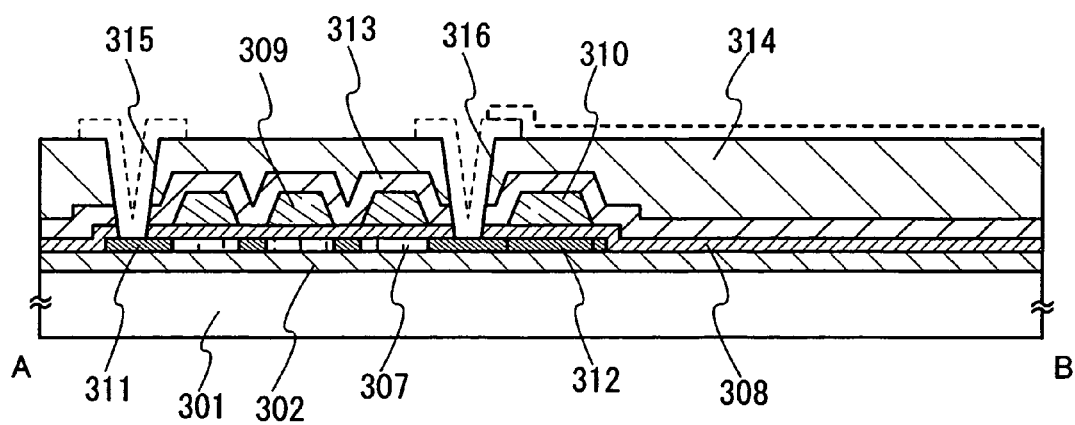

FIGS. 10A and 10B show a gate process. In this process, a gate insulating layer 308 and a gate electrode 309 are formed over the semiconductor layer 307. The gate insulating layer 308 is formed of silicon oxide, silicon nitride, a laminated body of silicon oxide and silicon nitride, a silicon oxynitride film, or the like. The gate electrode 309 is formed using a metal material such as tungsten, molybdenum, titanium, chromium, or aluminum. A shape of the gate electrode 309 is arbitrary; however, it is formed to intersect with the semiconductor layer 307. An overlapped portion thereof serves as a gate electrode. A capacity wiring 310 forming a capacity portion of a pixel is formed in the same layer simultaneously with this process. A portion in which the capacity wiring 310 is overlapped with the semiconductor layer 307 with the gate insulating layer 308 interposed therebetween, is to be a capacity portion. Side surfaces of the gate electrode 309 may be etched to be a tapered shape to improve a step coatability of a film that is formed in an upper layer thereof.

In a doping process, an impurity element having one conductivity is added to the semiconductor layer 307 to form a source or drain region. In this process, impurity regions 311 and 312 having one conductivity are formed in the semiconductor layer 307. This impurity region 311 having one conductivity forms a source region or a drain region of a thin film transistor. In this case, an impurity region having one conductivity at lower concentration may be provided in the vicinity of ends of a gate to form a so-called LDD region. In order to operate the thin film transistor as an n-channel type, an element typified by phosphorus belonging to Group 15 of the periodic law may be added to this impurity region 311 having one conductivity. Alternatively, in order to operate the thin film transistor as a p-channel type, an element typified by boron belonging to Group 13 of the periodic law may be added. It is to be noted that the semiconductor layer 307 that is overlapped with the capacity wiring 310 is to be one of electrodes of the capacity portion; therefore, an impurity having one conductivity is preferably added to the region.

FIGS. 10A and 10B also show a process for forming an interlayer insulating layer belonging to the process Y4 (see FIG. 6). The interlayer insulating layer is formed using an inorganic insulating material such as silicon nitride or silicon oxide; or an acrylic resin, a polyimide resin, or another organic resin material. The interlayer insulating layer is formed in order to protect the semiconductor layer, the gate electrode, and the like and to insulate and isolate between the gate wiring layer and a wiring layer formed thereover for making to the wiring layer be a multilayer. In addition, planarizing a surface on which the upper wiring is formed is included in the purpose of the interlayer insulating layer. As a favorable example for achieving such a purpose, FIGS. 10A and 10B show a structure of a stacked layer of a first interlayer insulating layer 313 and a second interlayer insulating layer 314. The interlayer insulating layer 313 is formed using an inorganic insulating material such as silicon nitride or silicon nitride oxide. Silicon nitride or the like can prevent an impurity such as a metal ion from diffusing in the semiconductor layer. Further, hydrogenation of the semiconductor layer 307 can be attempted by supplying hydrogen contained in a silicon nitride film to the semiconductor layer 307 by heat treatment. The second interlayer insulating layer 314 is formed using an acrylic resin, a polyimide resin, or another organic resin material by a spin coating method. Accordingly, a surface of the second interlayer insulating layer 314 can reduce unevenness of the lower layer to form a planarized surface. In addition to an organic resin material, the second interlayer insulating layer 314 may be formed using organic siloxane-based polymer having a Si—O—Si main chain, or organic silicon oxide in which a methyl group terminates a part of a network of SOG (Spin On Glass). The first interlayer insulating layer 313 may be formed to have a thickness of 50 to 200 nm, and the second interlayer insulating layer 314 may be formed to have a thickness of 500 to 2000 nm. Then, contact holes 315 and 316, which penetrate the gate insulating layer 308, the first interlayer insulating layer 313, and the second interlayer insulating layer 314, are formed by an etching processing.

Figure 11A:
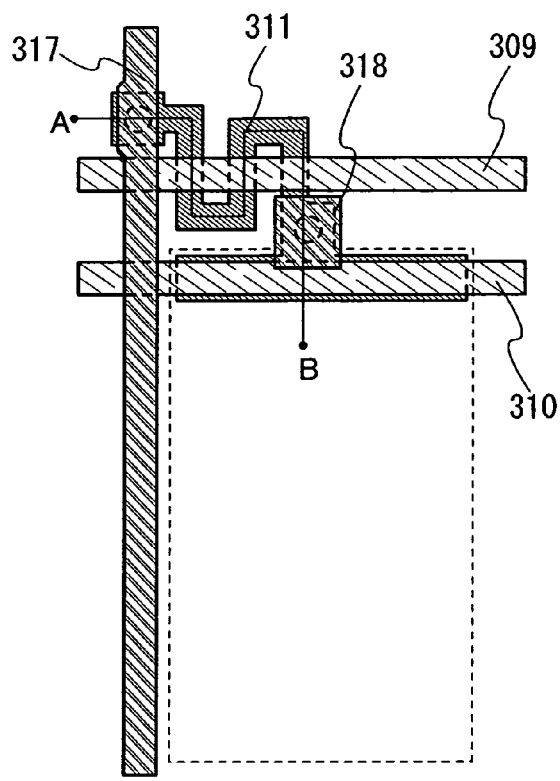
FIGS. 11A and 11B are views showing a manufacturing process of a liquid crystal display device in Embodiment 2.
Figure 11B:
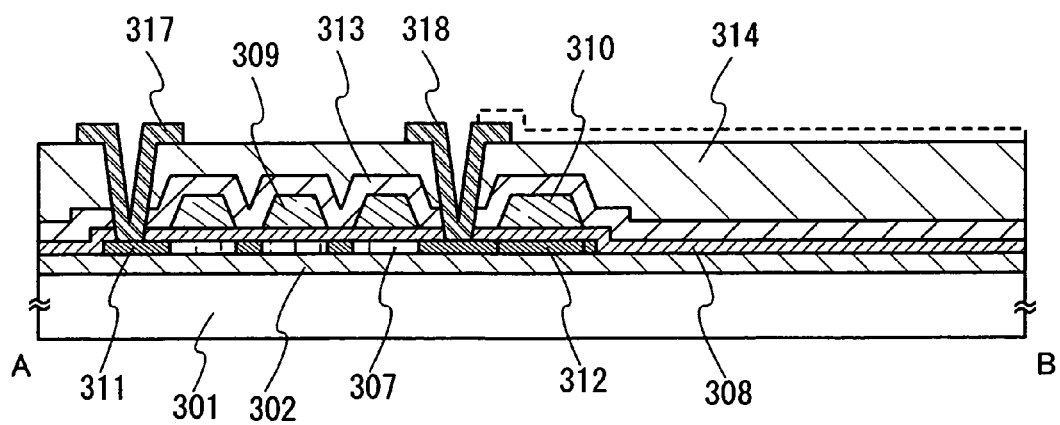

FIGS. 11A and 11B show a process for forming a wiring in the process Y4 (see FIG. 6). Wirings 317 and 318 are preferably formed using aluminum or a conductive material containing aluminum as its main component. In addition, a layer containing a metal such as titanium, molybdenum, chromium, or tungsten may be combined so as to stabilize contact with a semiconductor layer 307. In FIGS. 11A and 11B, the wiring 317 indicates a wiring forming a signal line in a pixel portion of a liquid crystal display device, and the wiring 318 indicates a wiring connecting a pixel electrode and a thin film transistor.

Figure 12A:
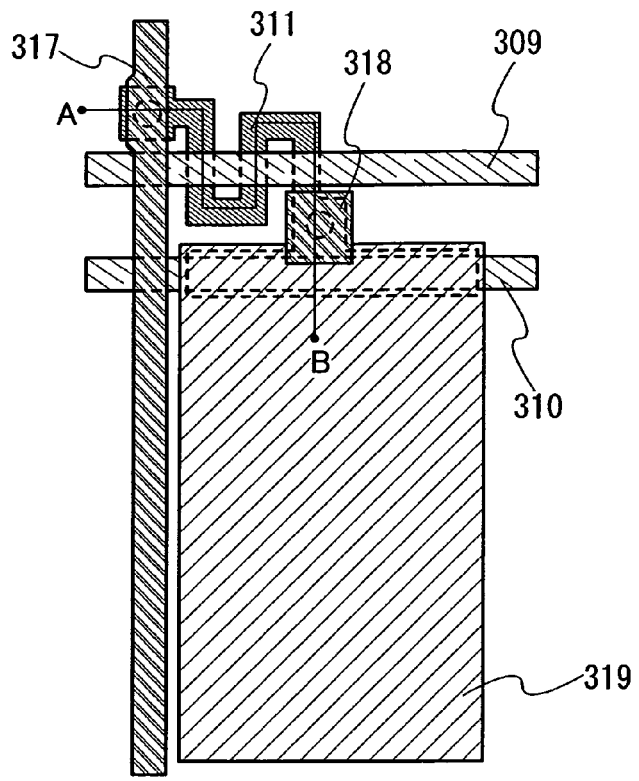
FIGS. 12A and 12B are views showing a manufacturing process of a liquid crystal display device in Embodiment 2.
Figure 12B:
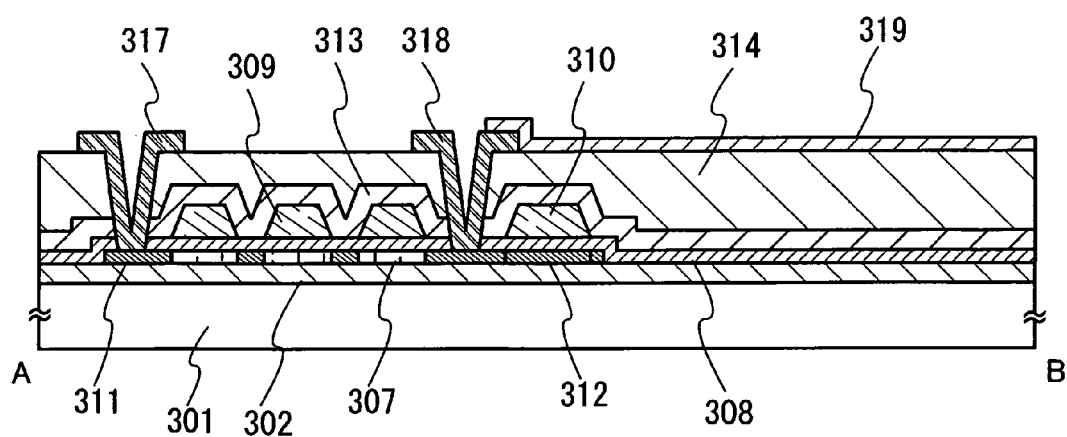

FIGS. 12A and 12B show a process for forming a pixel in the process Y4 (see FIG. 6). A pixel electrode 319 is connected to a wiring 318 and formed over a second interlayer insulating layer 314. The pixel electrode 319 is electrically connected to the wiring 318 by overlapping an edge portion of the pixel electrode 319 therewith. In FIGS. 12A and 12B, the wiring 318 is formed in advance, and the pixel electrode 319 is formed later to attempt the electrically connection; however, order of these formation may be reversed. In the case of a transmitting type liquid crystal display device, this pixel electrode 319 is formed using a compound of indium oxide and tin oxide (ITO), zinc oxide, a compound of ITO and zinc oxide, or another transmitting conductive material. In the case of a reflective type liquid crystal display device, the pixel electrode 319 is formed using a metal material such as aluminum.

Figure 13A:
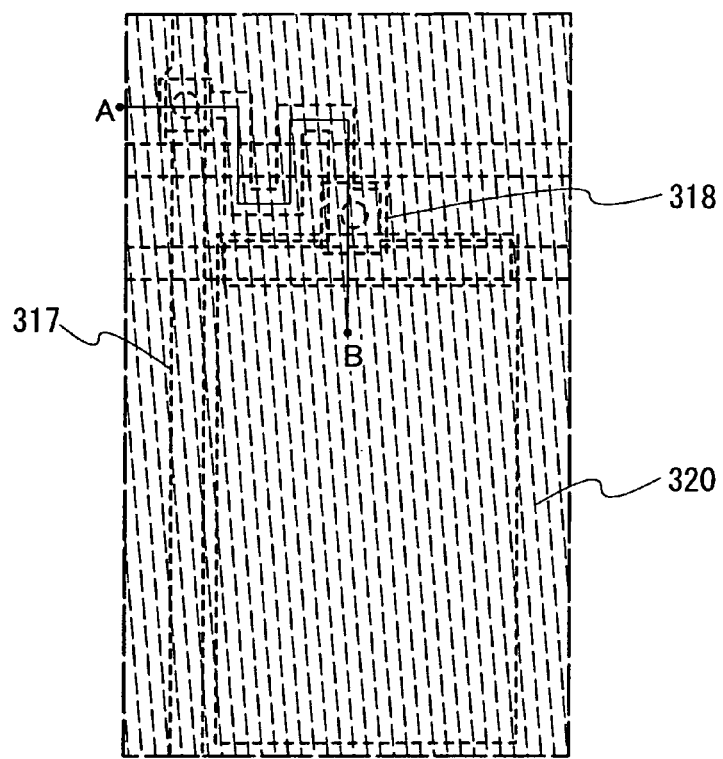
FIGS. 13A and 13B are views showing a manufacturing process of a liquid crystal display device in Embodiment 2.
Figure 13B:
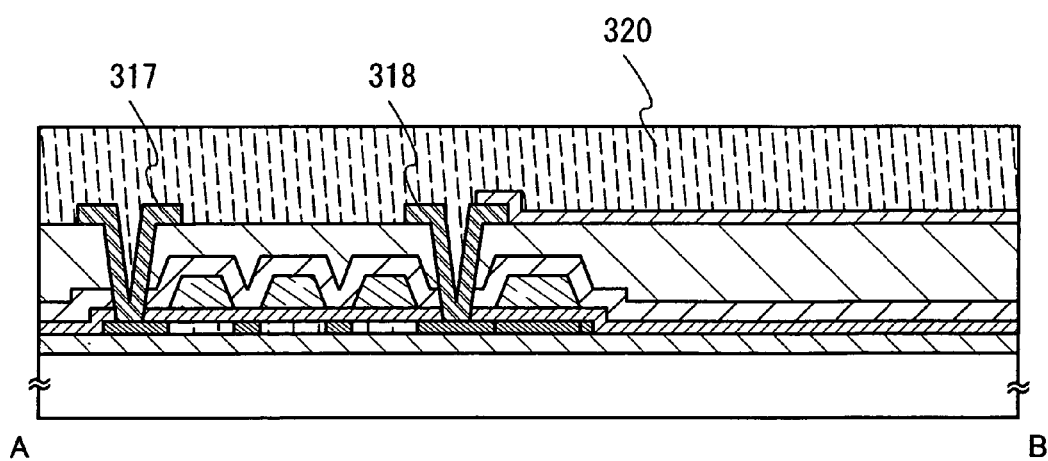

The process Y5 is a process for forming a spacer with respect to an element substrate in which the process proceeds by the formation of wirings. FIGS. 13A and 13B show a state in which a spacer formation layer 320 is formed over the element substrate provided with wirings 317 and 318 and a pixel electrode 319. When the spacer formation layer 320 is formed over the element substrate as described above, it is possible to prevent the element substrate from having a scratch or dust and to utilize temporarily the spacer formation layer 320 as a protective film. Accordingly, the process can be interrupted to stock half-finished goods by forming the spacer formation layer 320 over the element substrate. The spacer formation layer 320 can be formed using an organic resin material; however, it may be formed of another insulating material such as silicon oxide.

Figure 14A:
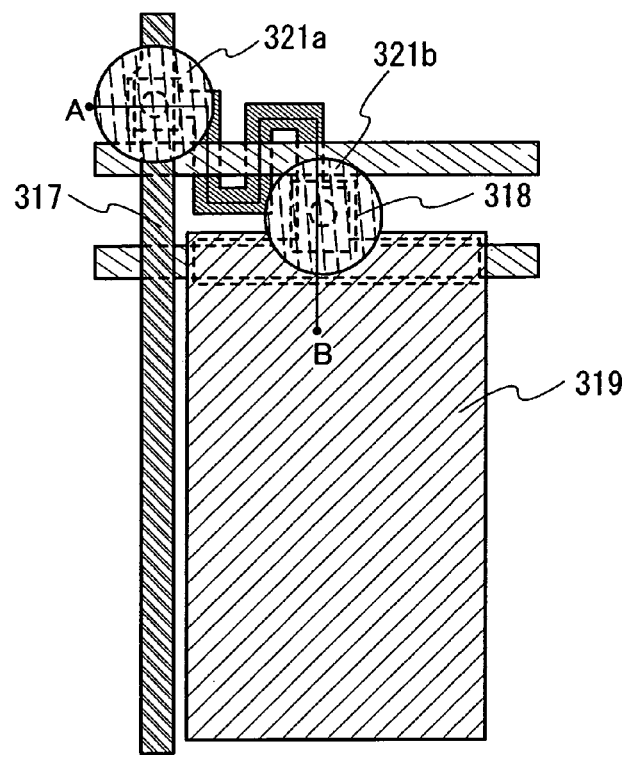
FIGS. 14A and 14B are views showing a manufacturing process of a liquid crystal display device in Embodiment 2.
Figure 14B:
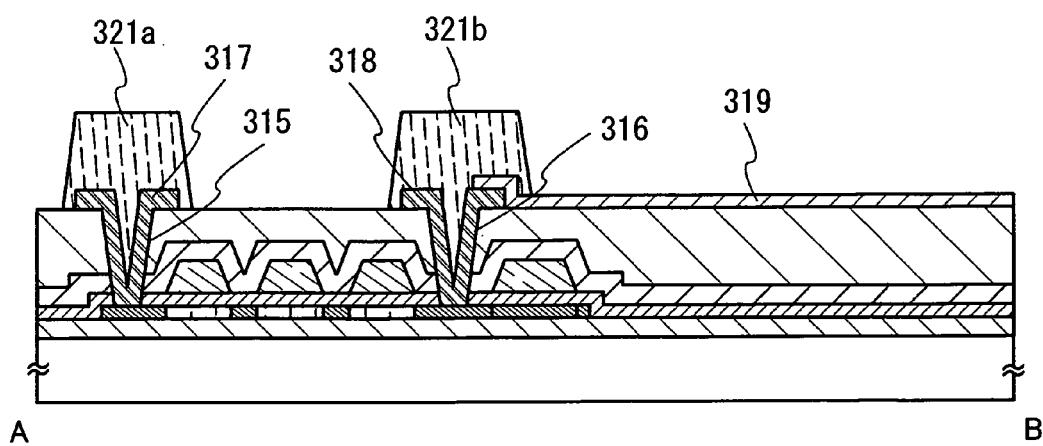

FIGS. 14A and 14B show a process for forming a spacer in the process Y7 (see FIG. 6). In this process, a spacer formation layer 320 is processed to form spacers 321a and 321b. In the case of a liquid crystal display device, the spacers 321a and 321b are preferably formed at positions corresponding to contact holes 315 and 316. Wirings 317 and 318 are formed corresponding to the contact holes 315 and 316; however, regions thereof are a concave portion. The spacers 321a and 321b are formed to cover the concave portion and formed with a defined height to keep a definite interval between an element substrate and an opposite substrate. Height of the spacers 321a and 321b may be 1 μm to 10 μm from top surfaces of a pixel electrode 319 or the wirings 317 and 318, which is necessary height for forming a liquid crystal layer.

Figure 15A:
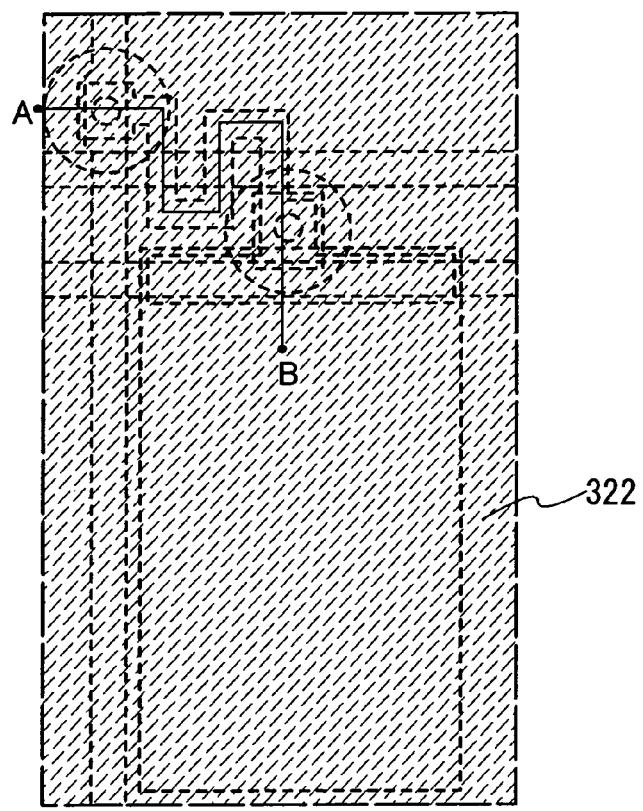
FIGS. 15A and 15B are views showing a manufacturing process of a liquid crystal display device in Embodiment 2.
Figure 15B:
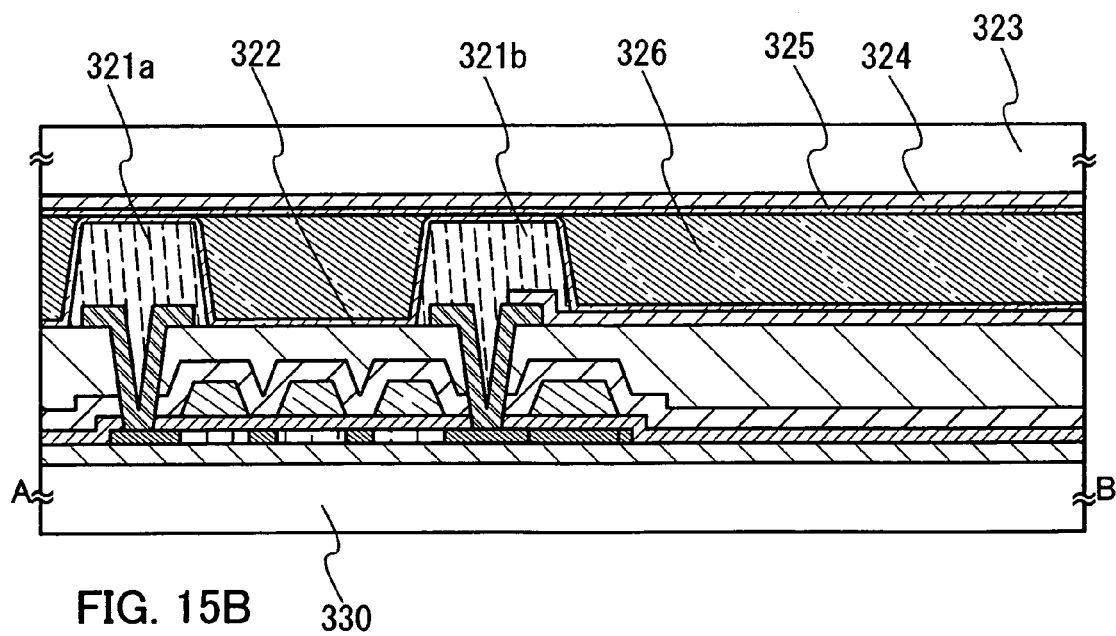

FIGS. 15A and 15B show a state through a process for forming an opposite substrate and a process for injecting liquid crystal in the process Y7 (see FIG. 6). In the process for forming an opposite substrate, an opposite electrode 324 and an orientation film 325 are formed on an opposite substrate 323, and then rubbing treatment or the like are performed. In addition, an orientation film 322 is formed over the element substrate. In the process for injecting liquid crystal, the element substrate and the opposite substrate 323 are fixed with a definite interval therebetween with spacers 321a and 321b, and liquid crystal is injected into a space formed by the spacers 321a and 321b to form a liquid crystal layer 326. For a liquid crystal material, TN liquid crystal is typically used. A liquid crystal panel is completed in such a manner. When a structure of a pixel electrode is modified to form a liquid crystal display device that operates by a MVA mode or an IPS mode, this case can be similarly applied.

Further, the process Y9 in FIG. 6 is a process for assembling a module, which combines a liquid crystal panel and a circuit substrate including a power supply circuit, a signal processing circuit, and the like.

Figure 16:
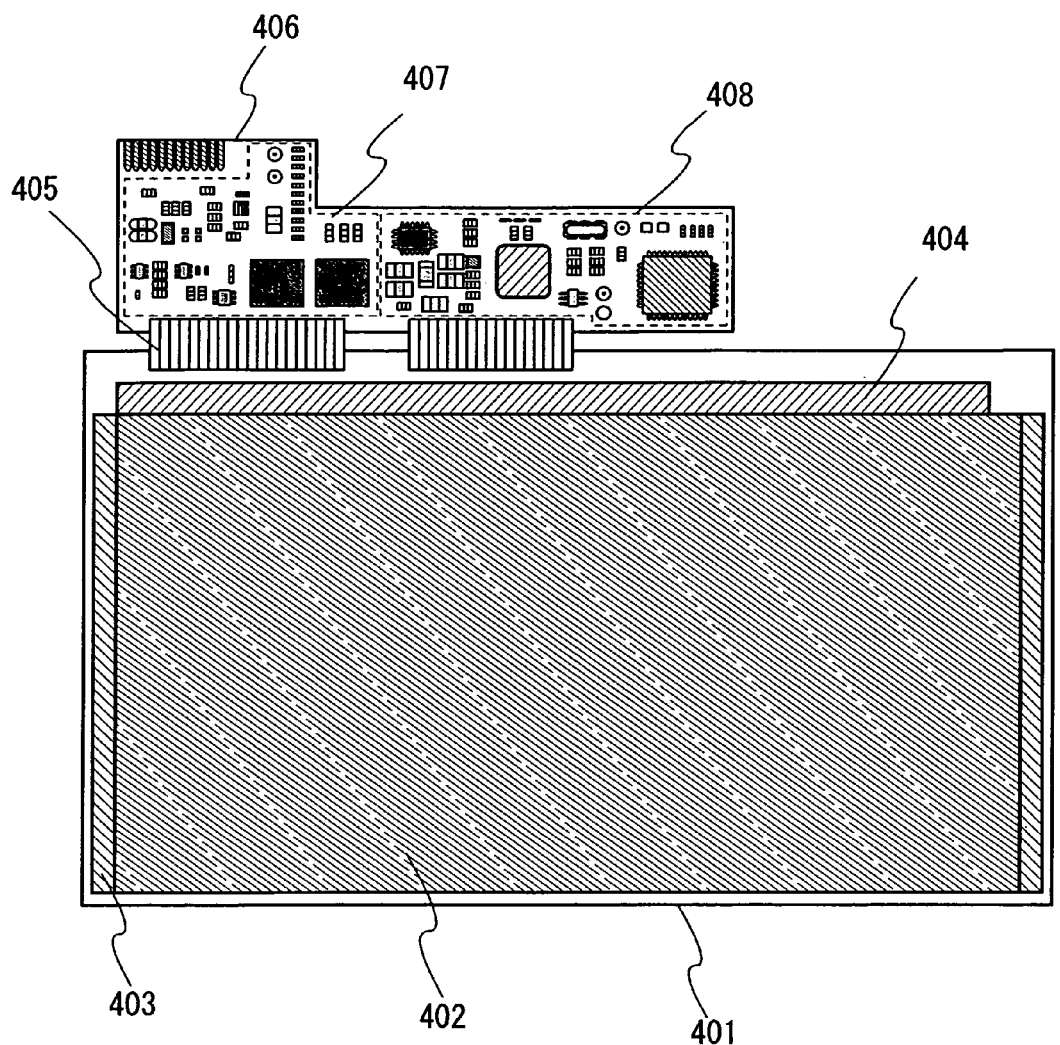
FIG. 16 is a diagram showing a liquid crystal module in which a liquid crystal panel and a circuit substrate are combined.

FIG. 16 shows a liquid crystal module in which a liquid crystal panel 401 and a circuit substrate 406 are combined. The liquid crystal panel 401 is provided with a pixel portion 402 that is formed by a thin film transistor; and a scanning line driver circuit 403 and a signal line driver circuit 404 that are similarly formed by a thin film transistor. In the circuit substrate 406, a control circuit 407 controlling operation of the liquid crystal panel, a signal dividing circuit 408, and the like are formed. The circuit substrate 406 and the liquid crystal panel 401 are connected by a connecting wiring 405.

Figure 17:
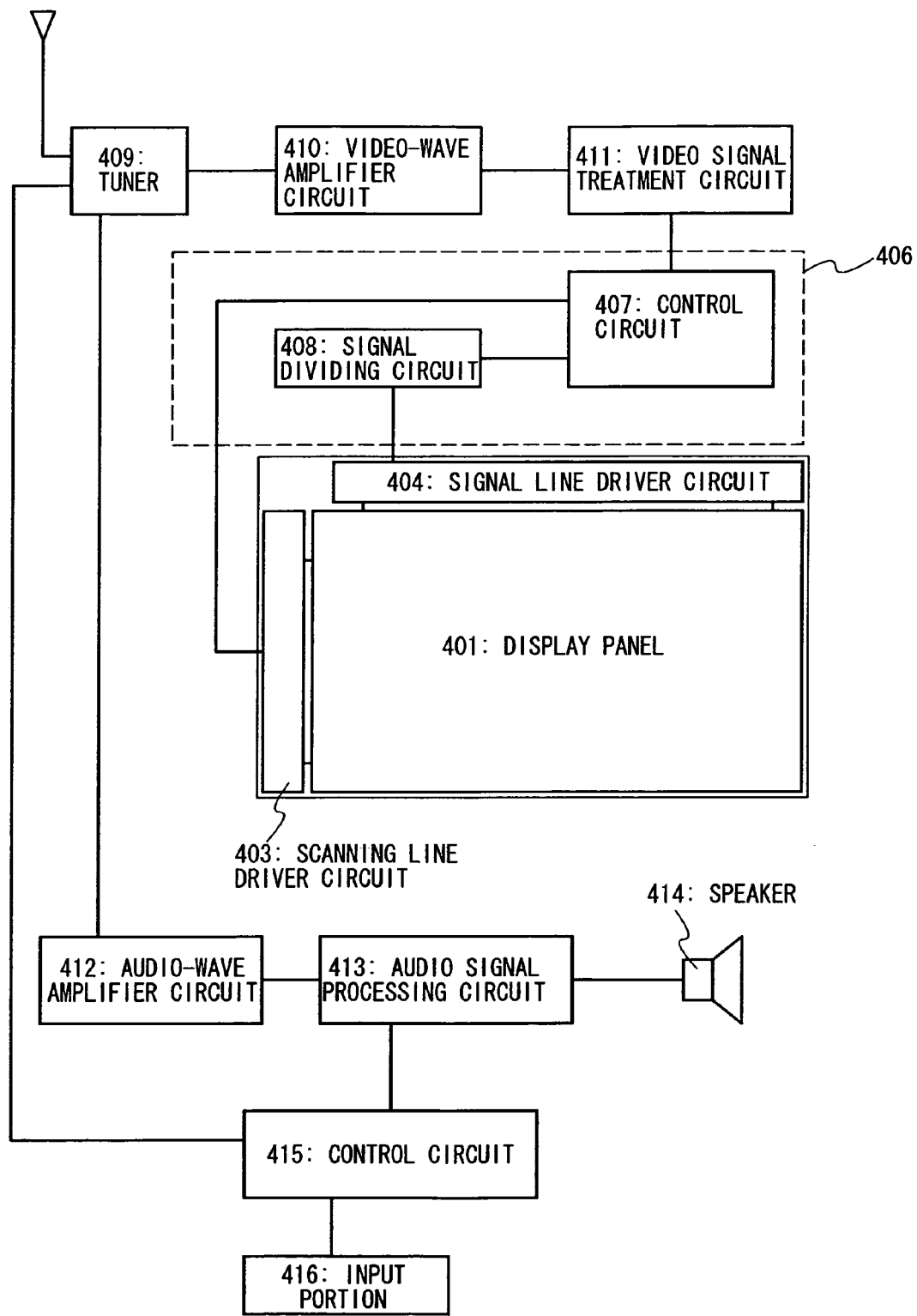
FIG. 17 is a block diagram showing a main structure of a liquid crystal television device.

This liquid crystal module can be applied widely by modifying a screen size in the liquid crystal panel depending on a usage. FIG. 17 is a block diagram showing a main structure of a liquid crystal television device. This block diagram shows a mode in which a necessary element as a television device is added to a liquid crystal module including a liquid crystal panel 401 and a circuit substrate 406. A tuner 409 receives a video signal and an audio signal. The video signal is transmitted to a video-wave amplifier circuit 410 and amplified therein. The signal outputted from the video-wave amplifier circuit 410 is converted into a chrominance signal corresponding to each color of red, green, and blue in a video signal treatment circuit 411. Then, the signal is inputted into a control circuit 407. The control circuit 407 converts the video signal into an input specification of a driver IC. Further, the control circuit 407 outputs the signal on the scanning line side and on the signal line side, respectively. In the case of digital driving, a structure in which a signal dividing circuit 408 is provided on the signal line side and an inputted digital signal is divided into m pieces and then supplied to the signal line driver circuit 404, may be employed. In the signal received by the tuner 409, an audio signal is transmitted to an audio-wave amplifier circuit 412. Its output is supplied to a speaker 414 via an audio signal processing circuit 413. A control circuit 415 receives control information such as a receiving station (receiving frequency) and sound volume from an input portion 416, and sends the signal to the tuner 409 and the audio signal processing circuit 413.

Figure 18:
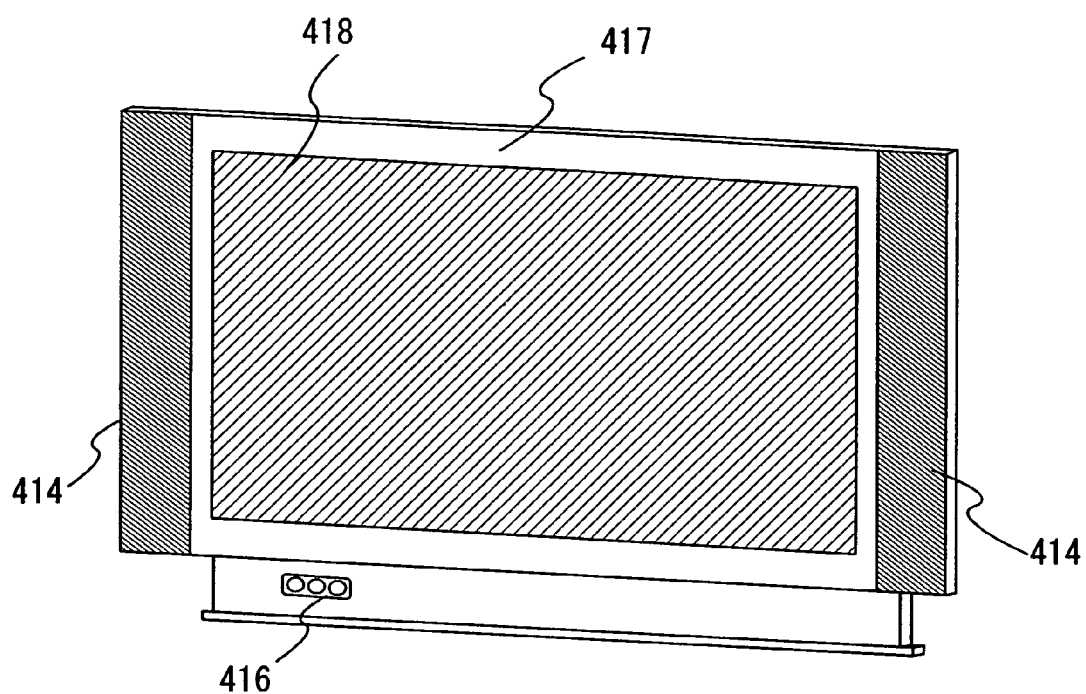
FIG. 18 is a diagram showing a television device in which a liquid crystal module is incorporated in a chassis.

FIG. 18 shows a liquid crystal television device in which such a liquid crystal module is incorporated in a chassis 417. A display screen 418 is formed by the liquid crystal module. In addition, speakers 414, an input portion 416, and the like are arbitrarily provided. Needless to say, the present embodiment is not limited to the liquid crystal television device. In addition to a monitor of a personal computer, the present invention can be applied to various usages such as an information display panel in the station of a railroad or an airport, and an advertising display panel on the street.

[Embodiment 3]

Details of a process for manufacturing a display device will be shown, which is based on Embodiment 1. The present embodiment illustrates a process for manufacturing an EL display device. In this manufacturing process, a process for manufacturing a thin film transistor and a process for manufacturing an EL element are included. It is to be noted that the same reference numerals are denoted in the same portion as Embodiment 2, and the description of details are omitted.

Since a process (X1) for forming a semiconductor layer is the same as that in Embodiment 2, a specific description is omitted. As described in FIGS. 8A to 8C, a surface protective film is formed over a polycrystalline semiconductor layer 303 so that a substrate with a formed semiconductor layer can be stocked. In addition, a process that will be shown below can be conducted by using the stocked substrate of the semiconductor layer is formed.

Figure 19A:
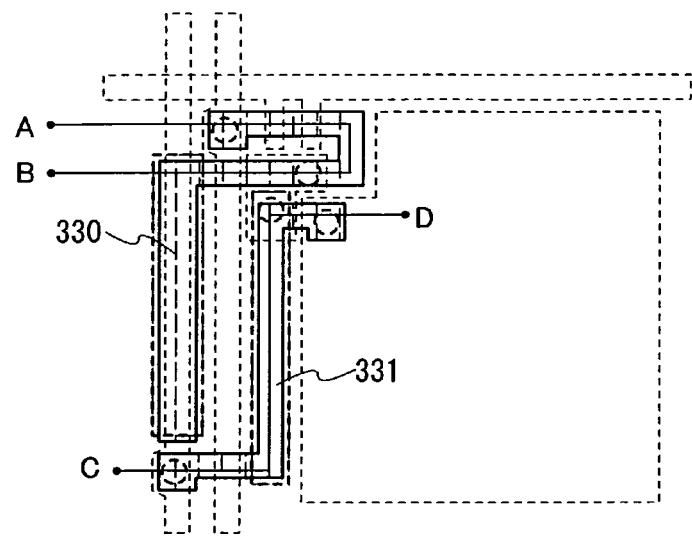
FIGS. 19A to 19C are views showing a manufacturing process of an EL display device in Embodiment 3.
Figure 19B:
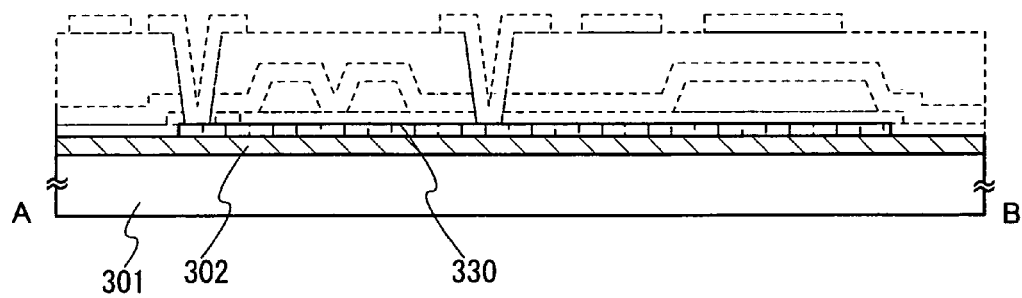
Figure 19C:
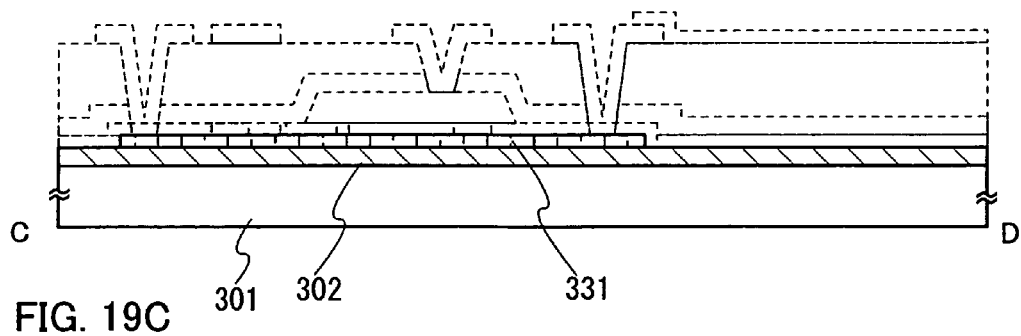

FIGS. 19A to 19C, FIGS. 20A to 20C, FIGS. 21A to 21C, and FIGS. 22A to 22C show an embodiment of the process Y1 and the process Y2 in the lower process 102 of FIG. 6. In these processes, a substrate to which a semiconductor layer 303 is formed in the upper process, is used. The process Y1 is a process for forming a TFT and includes a process for shaping a semiconductor layer, a gate process, and a doping process. FIGS. 19A to 19C show a process for shaping a semiconductor layer for providing two thin film transistors in one pixel. Semiconductor layers 330 and 331 are formed to have a predetermined shape. In a description below, expediently, a thin film transistor formed by the semiconductor layer 330 and a thin film transistor formed by the semiconductor layer 331 are also referred to as a first thin film transistor and a second thin film transistor, respectively. In addition to the transistor, a pattern forming another element such as a capacity portion may be included. FIGS. 19A to 19C show a structure in which two thin film transistors are arranged in one pixel; however, the number of the thin film transistors in each pixel is not limited in the purpose for driving a light emitting element. Further, a shape of the semiconductor layers 330 and 331 is also arbitrary. FIG. 19A is a top view of the pixel, FIG. 19B is a view showing a cross-sectional structure along A-B, and FIG. 19C is a view showing a cross-sectional structure along C-D. Reference numerals are used in common. Hereinafter, it is similar in FIGS. 20A to 20C, FIGS. 21A to 21C, and FIGS. 22A to 22C.

Figure 20A:
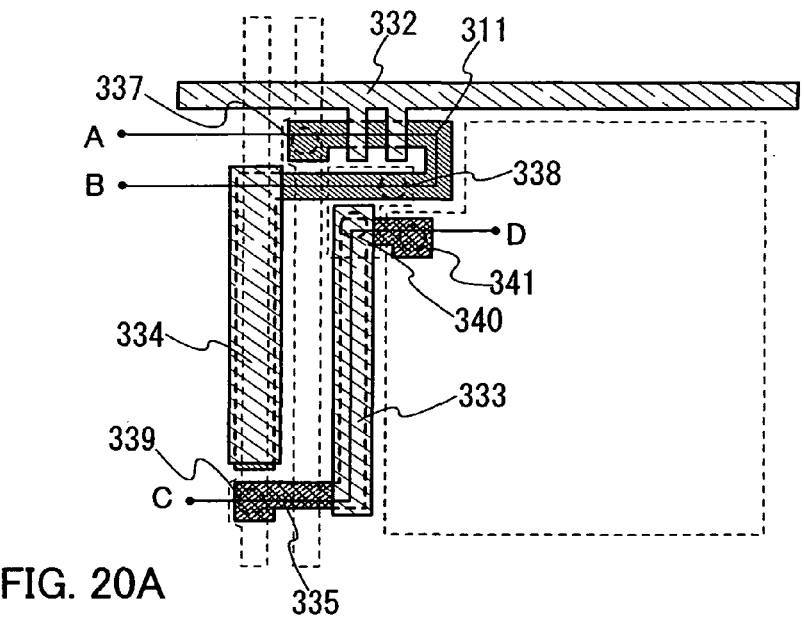
FIGS. 20A to 20C are views showing a manufacturing process of an EL display device in Embodiment 3.
Figure 20B:
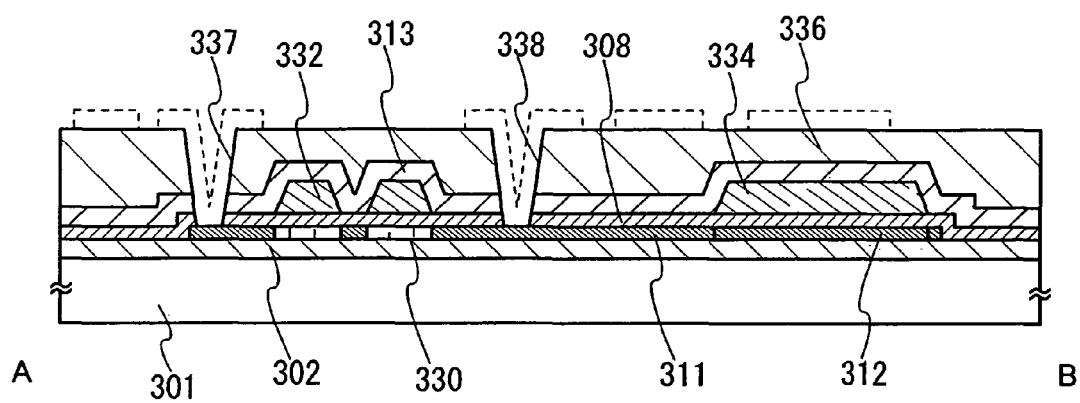
Figure 20C:
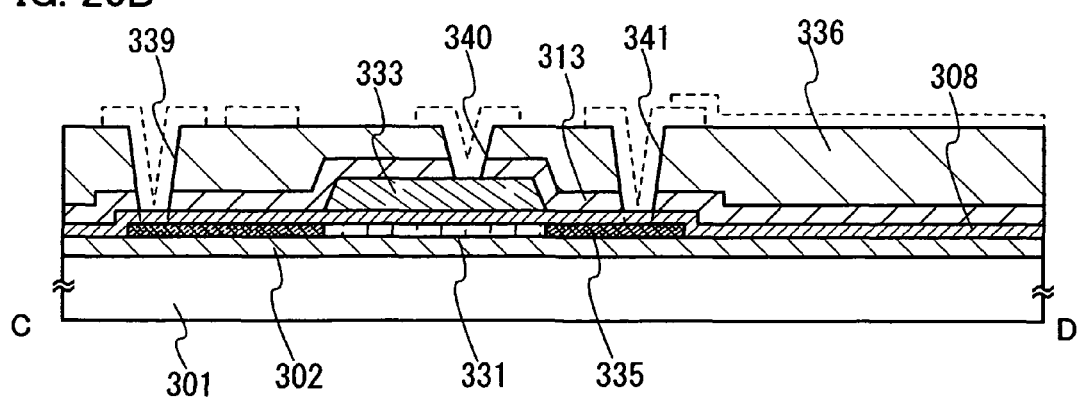

FIGS. 20A to 20C show a gate process. In this process, a gate insulating layer 308 is formed over semiconductor layers 330 and 331. Then, a gate electrode 332 of a first thin film transistor, a gate electrode 333 of a second thin film transistor, and a capacity electrode 334 are formed. The structure of these electrodes is similar to Embodiment 2. The capacity electrode 334 is formed to be overlapped with the impurity region 312 having one conductivity through the gate electrode 308 to form a capacity portion. An impurity region 311 having one conductivity formed in the semiconductor layer 330 may be formed after the formation of the gate electrode 332. This impurity region 311 having one conductivity forms a source region or a drain region of the thin film transistor. In this case, an impurity region having one conductivity of lower concentration may be provided in the vicinity of an end of the gate to form so-called a LDD region. An impurity region 335 formed in the semiconductor layer 331 is formed of conductivity opposite to the impurity region 311 having one conductivity. Accordingly, when the first thin film transistor is an n-channel type, the impurity region 335 is formed to be p-type and the second thin film transistor is to be a p-channel type. It is to be noted that a combination of this first thin film transistor and second thin film transistor is determined by considering operation of a circuit, and both thin film transistors may be formed to have same conductivity.

In a doping process, each impurity element having one conductivity is added to the semiconductor layers 330 and 331 to form a source and drain region. A specific mode is similar to Embodiment 2.

FIGS. 20A to 20C also show a process for forming an interlayer insulating film in the process Y3. In FIGS. 20A to 20C, a structure of a stacked layer of a first interlayer insulating layer 313 and a second interlayer insulating layer 336 is shown. The second interlayer insulating layer 336 is formed using an inorganic insulating material such as silicon oxide. Then, contact holes 337, 338, 339, 340, and 341, which penetrate the gate insulating layer 308, the first interlayer insulating layer 313, and the second interlayer insulating layer 336, are formed.

FIGS. 21A to 21C show a process for forming a wiring in the process Y3 (see FIG. 6). Wirings 342, 343, 344, and 345 are preferably formed using aluminum or a conductive material containing aluminum as its main component. In addition, a layer containing a metal such as titanium, molybdenum, chromium, or tungsten may be combined in order to stabilize a contact with semiconductor layers 330 and 331. The wiring 342 shown in FIGS. 20A to 20C forms a signal line in an EL display device, and the wiring 344 supply electric power to a light emitting element. Further, the wiring 343 connects the drain side of the first thin film transistor and the gate of the second thin film transistor. The wiring 345 connects a pixel electrode and the second thin film transistor.

Figure 22A:
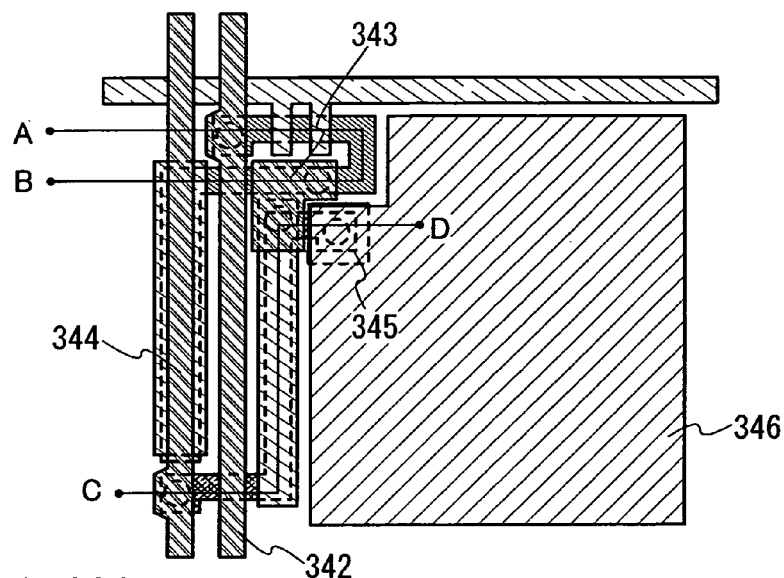
FIGS. 22A to 22C are views showing a manufacturing process of an EL display device in Embodiment 3.
Figure 22B:
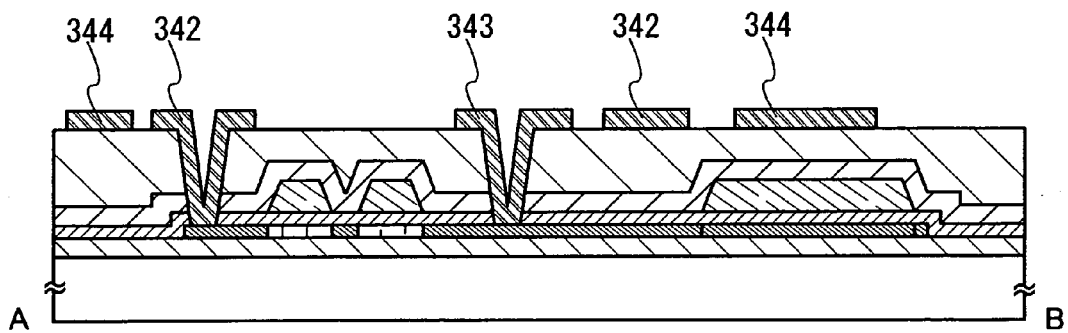
Figure 22C:
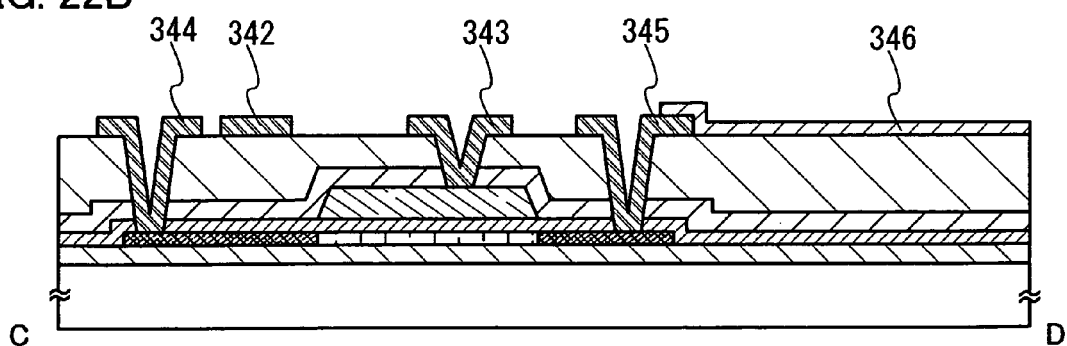

FIGS. 22A to 22C show a process for forming a pixel in the process Y3 (see FIG. 6). A pixel electrode 346 is connected to a wiring 345 and formed over a second interlayer insulating layer 336. The pixel electrode 346 is electrically connected to the wiring 345 by overlapping an edge portion of the pixel electrode 346 therewith. In FIGS. 22A to 22C, the wiring 345 is formed in advance and the pixel electrode 346 is formed later to attempt electrically connection; however, order of these formation may be reversed. In the case of a bottom emission type in an EL display device, the pixel electrode 346 is formed using a compound of indium oxide and tin oxide (ITO), zinc oxide, a compound of ITO and zinc oxide, or another transmitting conductive material. In order to obtain a top emission type, the pixel electrode 346 is formed using a metal.

The process Y5 is a process for forming a spacer with respect to the element substrate in which the process proceeds by the formation of wirings. This process is the same as the liquid crystal display device, and a spacer formation layer 347 is formed in same manner as FIGS. 13A and 13B.

Figure 23A:
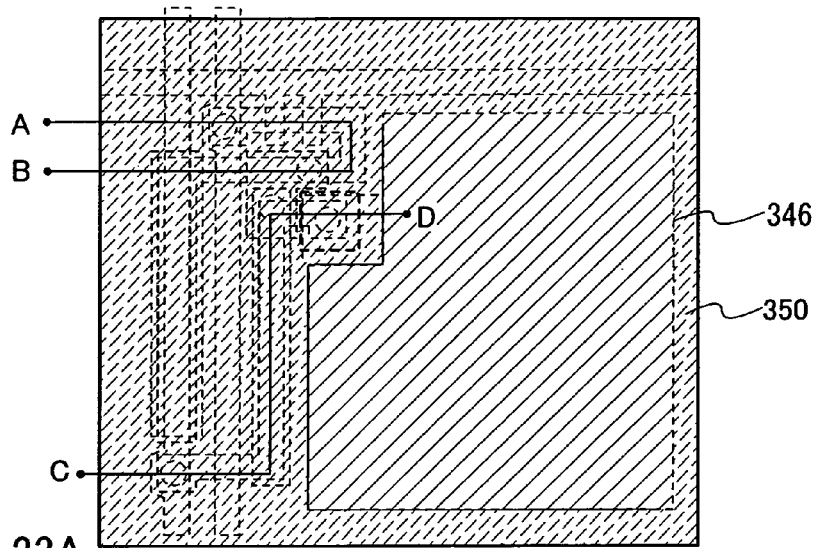
FIGS. 23A to 23C are views showing a manufacturing process of an EL display device in Embodiment 3.
Figure 23B:
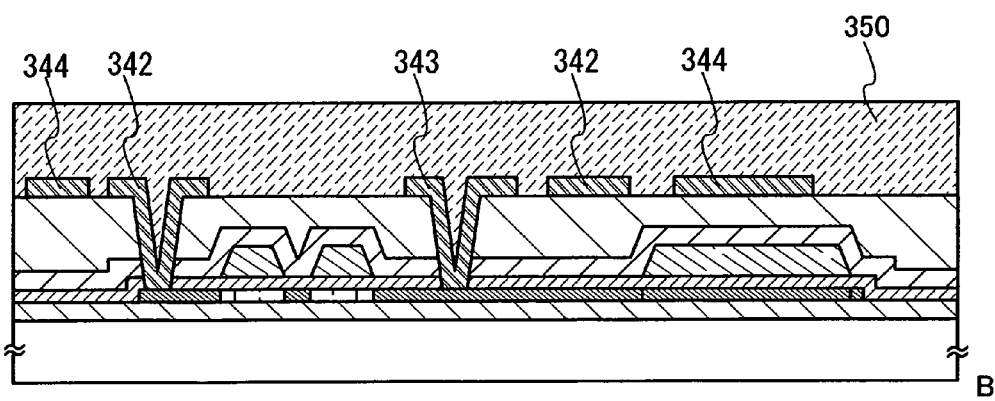
Figure 23C:
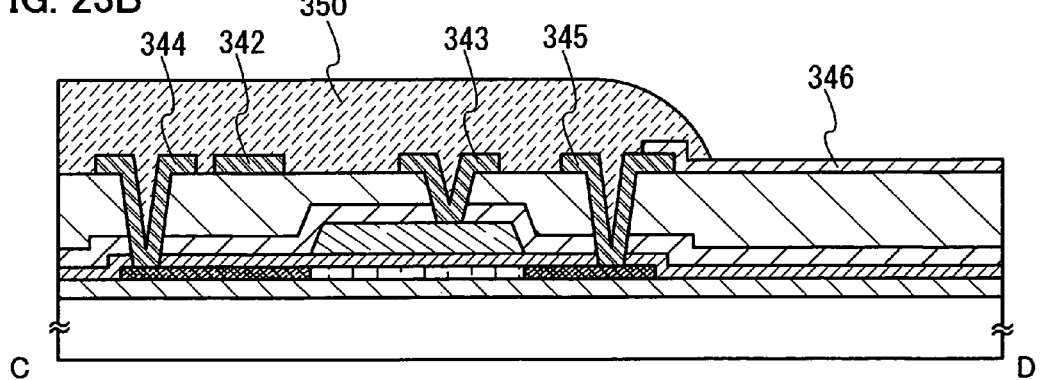

In a process for forming a light emitting element (Y6), this spacer formation layer 347 is processed. FIGS. 23A to 23C show a state in which the spacer formation layer 347 is processed to form a spacer 350. This spacer 350 is formed so as to cover wirings 342 to 345 and the peripheral edge portion of a pixel electrode 346. The pixel electrode 346 is exposed except for the peripheral edge by forming this spacer 350.

Figure 24A:
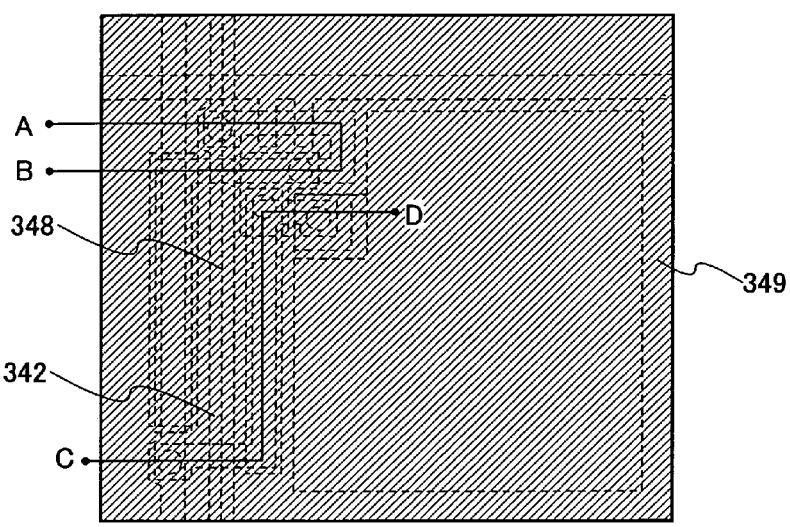
FIGS. 24A to 24C are views showing a manufacturing process of an EL display device in Embodiment 3.
Figure 24B:
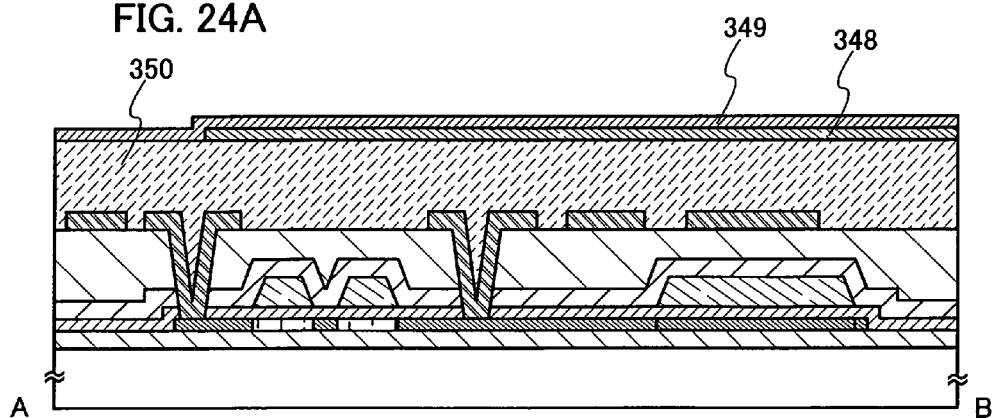
Figure 24C:
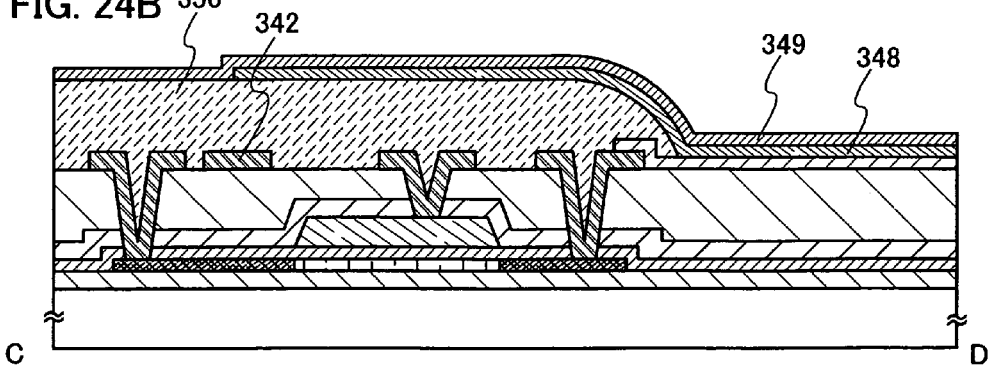

In FIGS. 24A to 24C, an EL layer 348 for generating electroluminescence is formed, and then, a common electrode 349 is formed. The EL layer 348 is formed by using an evaporation method or a coating method. In this case, it is desirable that heat treatment is performed at 200° C. to 300° C. in a decompression atmosphere or an inert atmosphere in order to eliminate gas included in the element substrate before forming the EL layer 348. In the case of forming a spacer 350 from a silicon oxide film, heat treatment having a further high temperature (410° C.) can be applied. The EL layer 348 is formed of a plurality of layers. There is a case where the EL layer 348 is formed by combining layers having different function, which is also referred to as a hole injecting and transporting layer, a light emitting layer, an electron injecting and transporting layer, and the like.

As a layer of forming the EL layer 348, a hole generating layer is given. As the hole generating layer, a layer including a hole transporting substance and an electron accepting substance with respect to the hole transporting substance is given. In this case, the electron accepting substance preferably has the molar ratio of 0.5 to 2 (=electron accepting substance with respect to the hole transporting substance/hole transporting substance) with respect to the hole transporting substance.

The hole transporting substance is a substance in which a hole transporting property is higher than an electron transporting property. For example, organic compounds of aromatic amine compounds such as 4,4'-bis[N-(1-naphthyl)-N-phenylamino]biphenyl (abbreviation: α-NPD), 4,4'-bis[N-(3-methylphenyl)-N-phenylamino]biphenyl (abbreviation: TPD), 4,4',4"-tris(N,N-diphenylamino)triphenylamine (abbreviation: TDATA), 4,4',4"-tris[N-(3-methylphenyl)-N-phenylamino]triphenylamine (abbreviation: MTDATA), and 4,4'-bis[N-{4-(N,N-di-m-tolylamino)phenyl}-N-phenylamino]biphenyl (abbreviation: DNTPD); phthalocyanine compounds such as phthalocyanine (abbreviation: $H_2Pc$), copper phthalocyanine (abbreviation: CuPc), and vanadyl phthalocyanine (abbreviation: VOPc); and the like can be used. It is to be noted that the hole transporting substance is not limited to these.

Further, as the electron accepting substance with respect to the hole transporting substance, any one of metal oxides, for example, vanadium oxide, molybdenum oxide, niobium oxide, rhenium oxide, tungsten oxide, ruthenium oxide, titanium oxide, chromium oxide, zirconium oxide, hafnium oxide, tantalum oxide, and the like can be used. It is to be noted that the electron accepting substance with respect to the hole transporting substance is not limited to these.

The hole generating layer in which an organic compound to be the hole transporting substance and metal oxide having an electron accepting property with respect to the substance are compounded, can be manufactured by a co-evaporation method. Specifically, a first layer can be formed by combining the same or different methods such as a co-evaporation method by resistance heating evaporation, a co-evaporation method by electron beam evaporation, a co-evaporation method by resistance heating evaporation and electron beam evaporation, deposition by resistance heating evaporation and sputtering, and deposition by electron beam evaporation and sputtering. The above examples assume a layer containing two kinds of materials; however, a layer containing three or more kinds of materials can also be formed similarly by combining the same or different methods.

Such a hole generating layer may include another organic compound. Another organic compound indicates rubrene or the like. Reliability can be improved by adding rubrene.

In addition, the hole generating layer may be formed from metal oxide such as molybdenum oxide, vanadium oxide, ruthenium oxide, cobalt oxide, or copper oxide.

In the hole generating layer, by compounding the organic compound and the metal oxide as described above, resistivity is made to be $5 \times 10^4$ Ωcm to $1 \times 10^6$ Ωcm. Accordingly, the hole generating layer has an advantage that even if the layer is thickened to have a film thickness of 50 nm to 500 nm, a driving voltage (or light emission starting voltage) is not increased. Therefore, the EL layer can be thickened, and short circuit failure of a light emitting element can be reduced. Further, a thickness of a hole generating layer can be made to differ depending on an emission wavelength in an EL display device in which light emitting elements having a different emission wavelength are combined.

The hole transporting layer is formed from a highly hole transporting substance, for example, an aromatic amine-based compound (in other words, a compound having a benzene ring-nitrogen bond) such as 4,4'-bis[N-(1-naphthyl)-N-phenylamino]biphenyl (abbreviation: α-NPD), N,N'-bis(3-methylphenyl)-N,N'-diphenyl-[1,1'-biphenyl]-4,4'-diamine (abbreviation: TPD), 4,4',4''-tris(N,N-diphenylamino)triphenylamine (abbreviation: TDATA), or 4,4',4''-tris[N-(3-methylphenyl)-N-phenylamino]triphenylamine (abbreviation: MTDATA). The substances described here are mainly substances having hole mobility of $10^{-6}$ cm$^2$/Vs or more. However, a substance other than the above materials may be used as long as it has a higher hole transporting property than the electron transporting property. The hole transporting layer may have a stacked structure-layer that includes two or more layers formed from the above substances as well as a single structure-layer.

A light emitting layer includes a highly luminescent substance. For, example, the light emitting layer is formed by freely combining a highly luminescent substance such as N,N-dimethylquinacridone (abbreviation: DMQd) or 3-(2-benzothiazolyl)-7-diethylaminocoumarin (abbreviation: coumarine 6); and a substance having high carrier transporting property and a favorable film quality (in other words, being hardly crystallized) such as tris(8-quinolinolato)aluminum (abbreviation: Alq$_3$) and 9,10-di(2-naphthyl)anthracene (abbreviation: DNA). However, Alq$_3$ and DNA have also high luminescence. Therefore, a light emitting layer having a structure in which these substances are used independently, may be employed.

The electron transporting layer is formed from a highly electron transporting substance, for example, a metal complex or the like having a quinoline skeleton or a benzoquinoline skeleton such as tris(8-quinolinolato)aluminum (abbreviation: Alq$_3$), tris(5-methyl-8-quinolinolato)aluminum (abbreviation: Almq$_3$), bis(10-hydroxybenzo[h]-quinolinato)beryllium (abbreviation: BeBq$_2$), and bis(2-methyl-8-quinolinolato-4-phenylphenolato-aluminum (abbreviation: BAlq); or the like can be used. Alternatively, a metal complex or the like having an oxazole or thiazole ligand such as bis[2-(2-hydroxyphenyl)-benzoxazolato]zinc (abbreviation: Zn(BOX)$_2$) and bis[2-(2-hydroxyphenyl)-benzothiazolato] zinc (abbreviation: Zn(BTZ)$_2$) can be used. In addition to the metal complex, 2-(4-biphenylyl)-5-(4-tert-butylphenyl)-1,3, 4-oxadiazole (abbreviation: PBD), 1,3-bis[5-(p-tert-butylphenyl)-1,3,4-oxadiazole-2-yl]benzene (abbreviation: OXD-7), 3-(4-tert-butylphenyl)-4-phenyl-5-(4-biphenylyl)-1,2,4-triazole (abbreviation: TAZ), 3-(4-tert-butylphenyl)-4-(4-ethylphenyl)-5-(4-biphenylyl)-1,2,4-triazole (abbreviation: p-EtTAZ), bathophenanthroline (abbreviation: BPhen), bathocuproin (abbreviation: BCP), or the like can be used. The substances described here are mainly substances having electron mobility of $10^{-6}$ cm$^2$/Vs or more. It is to be noted that a substance other than the above substances may be used as long as it has a higher electron transporting property than a hole transporting property. Further, the electron transporting layer may have a stacked structure-layer that includes two or more layers formed from the above substances as well as a single structure-layer.

Furthermore, 4,4-bis(5-methylbenzoxazol-2-yl)stilbene (abbreviation: BzOs) and lithium (Li) may be co-evaporated to provide the electron injecting layer. In addition to BzOs:Li, that has a highly electron injecting material, which is a compound of an alkali metal, an alkaline earth metal, or the like, such as CaF$_2$, lithium fluoride (LiF), or cesium fluoride (CsF) can be used. Further, a mixture of Alq$_3$ and magnesium (Mg) can also be used.

The common electrode 349 of the light emitting element can be formed of a metal, an alloy, an electrically conductive compound, a mixture thereof, or the like, which have a low work function (work function of 3.8 eV or lower). As a specific example of such a cathode material, an element belonging to Group 1 or 2 of the periodic table, in other words, alkali metal such as lithium (Li) or cesium (Cs); alkaline earth metal such as magnesium (Mg), calcium (Ca), or strontium (Sr); and an alloy (Mg:Ag or Al:Li) containing the above materials can be given. In such a manner, an EL panel in which a pixel is formed by a light emitting element connected to a thin film transistor can be obtained.

The process for assembling a module (Y8) in FIG. 6 is a process for manufacturing an EL module by combining an EL panel and a circuit substrate including a power supply circuit, a signal processing circuit, and the like. This process can be similarly performed in Embodiment 2 by replacing the liquid crystal panel 401 described in FIG. 16 with an EL panel. Further, an EL television device can be completed in the same manner as FIG. 17 and FIG. 18.

This application is based on Japanese Patent Application serial no. 2005-105477 filed in Japan Patent Office on Mar. 31, 2005, the entire contents of which are hereby incorporated by reference.

What is claimed is:
1. A production method for manufacturing at least two kinds of products, said production method comprising:
   manufacturing one of a liquid crystal display device and a light emitting display device;

receiving an order to manufacture the other one of the liquid crystal display device and the light emitting display device;

searching for half-finished goods corresponding to the one of the liquid crystal display device and the light emitting display device that may be used to manufacture the other one of the one of the liquid crystal display device and the light emitting display device;

performing, in accordance with the search, a common upper process which is common in manufacturing half-finished goods of both the liquid crystal display device and the light emitting display device;

distributing, in a lower process, at least part of the half-finished goods meant to be used to manufacture the one of the liquid crystal display device and the light emitting display device into an exclusive process for manufacturing the other one of the liquid crystal display device and the light emitting display device;

performing, in the lower process, the exclusive process for manufacturing the other one of the liquid crystal display device and the light emitting display device, wherein the common upper process includes a process for forming a semiconductor film.

2. A production method according to claim 1, wherein the common upper process and the lower process are conducted by one corporation.

3. A production method according to claim 1,
further comprising the step of performing, in the lower process, at least one common process which is common in manufacturing both the light emitting display device and the liquid crystal display device.

4. A production method according to claim 3,
wherein the at least one common process in the lower process includes at least one of a process for shaping the semiconductor film, a gate process, and a doping process.

5. A production method according to claim 3,
wherein the at least one common process in the lower process includes at least one of a process for forming an interlayer insulating film, a process for forming a wiring, and a process for forming a pixel.

6. A production method according to claim 3,
wherein the at least one common process in the lower process includes a process for forming a spacer insulating film.

7. A production method according to claim 1, wherein the exclusive process for manufacturing the light emitting display device includes at least one of a process for forming an opening pattern, a process for heat-treatment, a process for forming an EL element, and a sealing process.

8. A production method according to claim 1,
wherein the exclusive process for manufacturing the liquid crystal display device includes at least one of a process for processing a spacer, a process for mounting an opposite substrate, and a process for injecting liquid crystal.

9. A production method according to claim 1,
wherein the common upper process further includes at least one of a process for processing a substrate, a process for crystallizing for manufacturing a TFT panel, and a process for forming an oxide film.

10. A production method for manufacturing at least two kinds of products, said production method comprising:
manufacturing one of a liquid crystal display device and a light emitting display device;
receiving an order to manufacture the other one of the liquid crystal display device and the light emitting display device;
searching for half-finished goods corresponding to the one of the liquid crystal display device and the light emitting display device that may be used to manufacture the other one of the one of the liquid crystal display device and the light emitting display device;

performing, in accordance with the search, a common upper process which is common in manufacturing half-finished goods of both the liquid crystal display device and the light emitting display device;

distributing, in a lower process, at least part of the half-finished goods meant to be used to manufacture the one of the liquid crystal display device and the light emitting display device into an exclusive process for manufacturing the other one of the liquid crystal display device and the light emitting display device;

performing, in the lower process, the exclusive process for manufacturing the other one of the liquid crystal display device and the light emitting display device, wherein the common upper process includes a process for forming a semiconductor film, wherein the exclusive process for manufacturing the light emitting display device includes a process for forming a light emitting element, and wherein the exclusive process for manufacturing the liquid crystal display device includes a process for forming a liquid crystal element.

11. A production method according to claim 10, wherein the common upper process and the lower process are conducted by one corporation.

12. A production method according to claim 10,
wherein the exclusive process for manufacturing the light emitting display device includes at least one of a process for forming an opening pattern, a process for heat-treatment, a process for forming an EL element, and a sealing process.

13. A production method according to claim 10,
wherein the exclusive process for manufacturing the liquid crystal display device includes at least one of a process for processing a spacer, a process for mounting an opposite substrate, and a process for injecting liquid crystal.

14. A production method according to claim 10,
wherein the common upper process further includes at least one of a process for processing a substrate, a process for crystallizing for manufacturing a TFT panel, and a process for forming an oxide film.

15. A production method for manufacturing at least two kinds of products, said production method comprising:
manufacturing one of a liquid crystal display device and a light emitting display device;
receiving an order to manufacture the other one of the liquid crystal display device and the light emitting display device;
searching for half-finished goods corresponding to the one of the liquid crystal display device and the light emitting display device that may be used to manufacture the other one of the one of the liquid crystal display device and the light emitting display device;

performing, in accordance with the search, a common upper process which is common in manufacturing half-finished goods of both the liquid crystal display device and the light emitting display device;

distributing, in a lower process, at least part of the half-finished goods meant to be used to manufacture the one of the liquid crystal display device and the light emitting display device into an exclusive process for manufacturing the other one of the liquid crystal display device and the light emitting display device;

performing, in the lower process, the exclusive process for manufacturing the other one of the liquid crystal display device and the light emitting display device; and a step of performing, in the lower process, at least one common process which is common in manufacturing both the light emitting display device and the liquid crystal display device, wherein the common upper process includes a process for forming a semiconductor film, wherein the exclusive process for manufacturing the light emitting display device includes a process for forming a light emitting element, and wherein the exclusive process for manufacturing the liquid crystal display device includes a process for forming a liquid crystal element.

16. A production method according to claim 15, wherein the common upper process and the lower process are conducted by one corporation.

17. A production method according to claim 15, wherein the at least one common process in the lower process includes at least one of a process for shaping the semiconductor film, a gate process, and a doping process.

18. A production method according to claim 15, wherein the at least one common process in the lower process includes at least one of a process for forming an interlayer insulating film, a process for forming a wiring, and a process for forming a pixel.

19. A production method according to claim 15, wherein the at least one common process in the lower process includes a process for forming a spacer insulating film.

20. A production method according to claim 15, wherein the exclusive process for manufacturing the light emitting display device includes at least one of a process for forming an opening pattern, a process for heat-treatment, a process for forming an EL element, and a sealing process.

21. A production method according to claim 15, wherein the exclusive process for manufacturing the liquid crystal display device includes at least one of a process for processing a spacer, a process for mounting an opposite substrate, and a process for injecting liquid crystal.

22. A production method according to claim 15, wherein the common upper process further includes at least one of a process for processing a substrate, a process for crystallizing for manufacturing a TFT panel, and a process for forming an oxide film.

* * * * *